（12）United States Patent
Kishimoto et al.

(10) Patent No.: US 12,547,289 B2
(45) Date of Patent: Feb. 10, 2026

(54) ELECTRONIC APPARATUS AND MANUFACTURING METHOD OF THE SAME

(71) Applicant: Samsung Display Co., Ltd., Yongin-si (KR)

(72) Inventors: Hirotsugu Kishimoto, Gyeonggi-do (KR); Dasom Gu, Asan-si (KR); Yongchan Jeon, Cheonan-si (KR); Hyun-Been Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/335,598

(22) Filed: Jun. 1, 2021

(65) Prior Publication Data

US 2022/0066583 A1    Mar. 3, 2022

(30) Foreign Application Priority Data

Aug. 31, 2020   (KR) ........................ 10-2020-0110619

(51) Int. Cl.
*G06F 3/046* (2006.01)
*B32B 7/12* (2006.01)
(Continued)

(52) U.S. Cl.
CPC ................ *G06F 3/046* (2013.01); *B32B 7/12* (2013.01); *B32B 15/04* (2013.01); *B32B 15/18* (2013.01); *B32B 37/06* (2013.01); *B32B 37/12* (2013.01); *G06F 3/0443* (2019.05); *B32B 2038/0076* (2013.01); *B32B 2255/26* (2013.01);
(Continued)

(58) Field of Classification Search
CPC ...... G06F 3/0412; G06F 3/0445; G06F 3/046; G06F 3/044; G06F 3/0443; G06F 3/041; G06F 3/03545; G06F 2203/04103; G06F 2203/04106; G06F 2203/04112; G06F 2203/04102; G06F 2203/04108; G06F 2203/04101; G06F 1/1643
See application file for complete search history.

(56) References Cited

U.S. PATENT DOCUMENTS 10,707,280 B2    7/2020   Jeong et al.
2004/0189587 A1*  9/2004   Jung .................. G02F 1/13338
                                                           345/102
(Continued)

FOREIGN PATENT DOCUMENTS

CN           1534333 A      10/2004
CN         104054409 A       9/2014
(Continued)

*Primary Examiner* — Dong Hui Liang
(74) *Attorney, Agent, or Firm* — CHAU & ASSOCIATES, LLC

(57) ABSTRACT

An electronic apparatus includes a window, a display panel disposed below the window, and a digitizer disposed below the display panel. The digitizer includes a base layer having a first surface and a second surface opposing the first surface, a first sensing coil disposed on the first surface of the base layer, a second sensing coil disposed on the second surface of the base layer, a first adhesive layer disposed on the first sensing coil, and a second adhesive layer disposed on the second sensing coil. The first adhesive layer and the second adhesive layer are multi-curing adhesive layers.

18 Claims, 19 Drawing Sheets

(51) Int. Cl.
  *B32B 15/04*       (2006.01)
  *B32B 15/18*       (2006.01)
  *B32B 37/06*       (2006.01)
  *B32B 37/12*       (2006.01)
  *G06F 3/044*       (2006.01)
  *B32B 38/00*       (2006.01)

(52) U.S. Cl.
  CPC ..... *B32B 2264/105* (2013.01); *B32B 2305/72* (2013.01); *B32B 2307/208* (2013.01); *B32B 2307/4026* (2013.01); *B32B 2307/51* (2013.01); *B32B 2307/558* (2013.01); *B32B 2310/08* (2013.01); *B32B 2457/208* (2013.01); *G06F 2203/04102* (2013.01); *G06F 2203/04103* (2013.01); *G06F 2203/04107* (2013.01)

(56) References Cited

U.S. PATENT DOCUMENTS

| | | | | |
|---|---|---|---|---|
| 2007/0002156 | A1* | 1/2007 | Hagood, IV | G02B 26/04 |
| | | | | 348/296 |
| 2009/0146945 | A1* | 6/2009 | Cho | G06F 3/0443 |
| | | | | 345/104 |
| 2013/0225716 | A1* | 8/2013 | Jin | A61K 6/887 |
| | | | | 523/116 |
| 2014/0362505 | A1* | 12/2014 | Jang | H05K 9/0075 |
| | | | | 361/679.4 |
| 2015/0248184 | A1* | 9/2015 | Lee | G06F 3/046 |
| | | | | 345/173 |
| 2015/0338888 | A1* | 11/2015 | Kim | G06F 1/1643 |
| | | | | 345/156 |
| 2017/0088758 | A1* | 3/2017 | Bzowej | C08G 18/348 |
| 2017/0123569 | A1 | 5/2017 | Kim et al. | |
| 2018/0019293 | A1* | 1/2018 | Choi | H01L 27/3272 |
| 2019/0035719 | A1* | 1/2019 | Daitoku | H05K 3/4007 |
| 2019/0129553 | A1 | 5/2019 | Oh et al. | |
| 2020/0026390 | A1* | 1/2020 | Gwon | G06F 3/04164 |
| 2021/0301403 | A1* | 9/2021 | Routh | B31F 1/07 |
| 2021/0311591 | A1 | 10/2021 | Hwang et al. | |

FOREIGN PATENT DOCUMENTS

| | | |
|---|---|---|
| CN | 204833197 U | 12/2015 |
| CN | 106415458 A | 2/2017 |
| CN | 108138023 A | 6/2018 |
| CN | 108735783 A | 11/2018 |
| CN | 110737353 A | 1/2020 |
| KR | 10-2004-0084504 | 10/2004 |
| KR | 10-2009-0059726 | 6/2009 |
| KR | 10-2013-0090385 | 8/2013 |
| KR | 10-1510294 | 4/2015 |
| KR | 10-2015-0103612 | 9/2015 |
| KR | 10-2015-0135060 | 12/2015 |
| KR | 10-2016-0150179 | 12/2016 |
| KR | 10-2018-0008965 | 1/2018 |
| KR | 10-2019-0020495 | 3/2019 |
| KR | 10-2019-0047168 | 5/2019 |
| KR | 10-2021-0124608 | 10/2021 |
| WO | WO-2021250922 A1 * | 12/2021 |

* cited by examiner

ELECTRONIC APPARATUS AND MANUFACTURING METHOD OF THE SAME

CROSS-REFERENCE TO RELATED APPLICATION(S)

This U.S. non-provisional patent application claims priority to and benefits of Korean Patent Application No. 10-2020-0110619 under 35 U.S.C. § 119, filed on Aug. 31, 2020 in the Korean Intellectual Property Office, the entire contents of which are hereby incorporated by reference.

BACKGROUND

The disclosure herein relates to an electronic apparatus with improved reliability and a manufacturing method of such an electronic apparatus with improved reliability and a manufacturing method of the same.

In an information-oriented society, the importance of an electronic apparatus as a visual information delivery medium has emerged. Electronic apparatuses include liquid crystal displays (LCDs), plasma display panels (PDPs), organic light emitting displays (OLEDs), field effect displays (FEDs), electrophoretic displays (EPDs), and the like.

An electronic apparatus is activated by an electrical signal. The electronic apparatus may include input sensors for sensing external inputs and a display panel for displaying an image.

The electronic apparatus may include electrode patterns that are activated by electrical signals. The region where the electrode patterns are activated may display information or react to an input signal applied from the outside.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides an electronic apparatus having a sensing sensor which senses an external input and whose reliability is improved.

The disclosure also provides a method for manufacturing an electronic apparatus with improved visibility and folding properties.

An embodiment provides an electronic apparatus that may include a window, a display panel disposed below the window, and a digitizer disposed below the display panel. The digitizer may include a base layer having a first surface and a second surface opposing the first surface, a first sensing coil disposed on the first surface of the base layer, a second sensing coil disposed on the second surface of the base layer, a first adhesive layer disposed on the first sensing coil, and a second adhesive layer disposed on the second sensing coil. The first adhesive layer and the second adhesive layer may be multi-curing adhesive layers.

In an embodiment, the first adhesive layer may entirely overlap an upper surface of the first sensing coil, and the second adhesive layer may entirely overlap an upper surface of the second sensing coil.

In an embodiment, the electronic apparatus may further include a shielding layer disposed below the second adhesive layer. The shielding layer may include a metal.

In an embodiment, the shielding layer may include at least one of permalloy, invar, and stainless steel.

In an embodiment, the electronic apparatus may further include a magnetic sheet disposed on the shielding layer. The magnetic sheet may include magnetic metal powder (MMP).

In an embodiment, the electronic apparatus may further include a first sub-adhesive layer disposed on the first adhesive layer. The first sub-adhesive layer may have a storage modulus that is lower than the storage modulus of the first adhesive layer.

In an embodiment, the storage modulus of first sub-adhesive layer may be in a range of about 0.01 MPa to about 1 MPa at about −20° C.

In an embodiment, the electronic apparatus may further include a second sub-adhesive layer disposed below the second adhesive layer. The second sub-adhesive layer may have a storage modulus that is lower than the storage modulus of the second adhesive layer.

In an embodiment, the storage modulus of the second sub-adhesive layer may be in a range of about 0.01 MPa to about 1 MPa at about −20° C.

In an embodiment, the electronic apparatus may further include a cushion layer disposed below the second adhesive layer.

In an embodiment, the electronic apparatus may further include a light blocking layer disposed on the first adhesive layer. The light blocking layer may have a transmittance of about 50% or less.

In an embodiment, the light blocking layer may include pigment particles dispersed in a binder, and the binder may be polyethyleneterephthalate or polyimide.

In an embodiment, the first adhesive layer and the second adhesive layer may not include an acid component.

In an embodiment, the electronic apparatus may include a plating layer on an upper surface of each of first sensing coil and the second sensing coil.

In an embodiment, the electronic apparatus may include a folding region foldable with respect to a folding axis extending in one direction, a first non-folding region extending toward a side of the folding region, and a second non-folding region extending toward another side of the folding region.

In an embodiment, a method for manufacturing an electronic apparatus may include manufacturing a digitizer and disposing a display panel on the digitizer. The manufacturing of the digitizer may include forming a first sensing coil on a first surface of a base layer, forming a second sensing coil on a second surface of the base layer, the second surface opposing the first surface, disposing a first adhesive layer in a semi-cured state on the first sensing coil, disposing a second adhesive layer in a semi-cured state on the second sensing coil, increasing the flatness of the first adhesive layer and the flatness of the second adhesive layer, and applying light to the first adhesive layer and the second adhesive layer to substantially fully cure the first adhesive layer and the second adhesive layer.

In an embodiment, the increasing of the flatness of the first adhesive layer and of the second adhesive layer may include applying heat to the first adhesive layer and the second adhesive layer.

In an embodiment, in the method of manufacturing an electronic apparatus, the first adhesive layer may entirely overlap an upper surface of the first sensing coil, and the second adhesive layer may entirely overlap an upper surface of the second sensing coil.

In an embodiment, the method for manufacturing an electronic apparatus may further include forming a first sub-adhesive layer on the first adhesive layer.

In an embodiment, the method for manufacturing an electronic apparatus may further include forming a second sub-adhesive layer on the second adhesive layer.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1A:
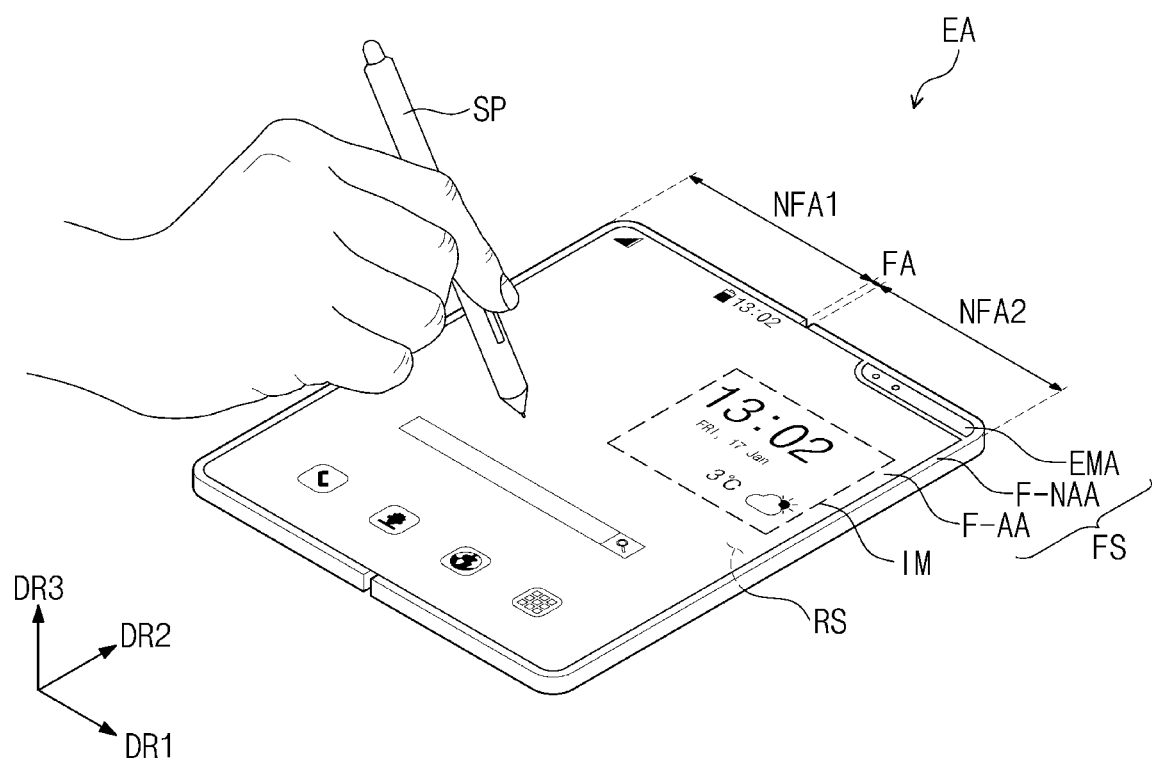
FIG. 1A is a schematic perspective view of an electronic apparatus according to an embodiment in an unfolded state.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the disclosure, when an element (or an area, a layer, a portion, etc.) is referred to as being "on," "connected to," or "coupled to" another element, it means that the element may be directly disposed on/connected to/coupled to the other element, or that a third element may be disposed therebetween. Also, when an element is referred to as being "in contact" or "contacted" or the like to another element, the element may be in "electrical contact" or in "physical contact" with another element; or in "indirect contact" or in "direct contact" with another element.

Like reference numerals refer to like elements. Also, in the drawings, the thickness, the ratio, and the dimensions of elements are exaggerated for an effective description of technical contents.

The term "and/or," includes all combinations of one or more of which associated configurations may define. The term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of example embodiments. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

The terms "face" (or "oppose") and "facing" (or "opposing") mean that a first element may directly or indirectly oppose a second element. In a case in which a third element intervenes between the first and second element, the first and second element may be understood as being indirectly opposed to one another, although still facing (or "opposing") each other.

The phrase "in a plan view" means viewing the object from the top, and the phrase "in a schematic cross-sectional view" means viewing a cross-section of which the object is vertically cut from the side.

Unless otherwise defined, all terms (including technical and scientific terms) used herein have the same meaning as commonly understood by those skilled in the art to which the disclosure pertains. It is further understood that terms defined in commonly used dictionaries should be interpreted as having meanings consistent with the meanings in the context of the related art, and will not be interpreted in an ideal or overly formal sense unless expressly so defined herein.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

In the disclosure, when "Component B is directly disposed on Component A," it means that no separate adhesive layer and adhesive member is disposed between Component A and Component of B.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

In the specification and the claims, the phrase "at least one of" is intended to include the meaning of "at least one selected from the group of" for the purpose of its meaning and interpretation. For example, "at least one of A and B" may be understood to mean "A, B, or A and B."

Hereinafter, embodiments will be described with reference to the accompanying drawings.

Figure 1B:
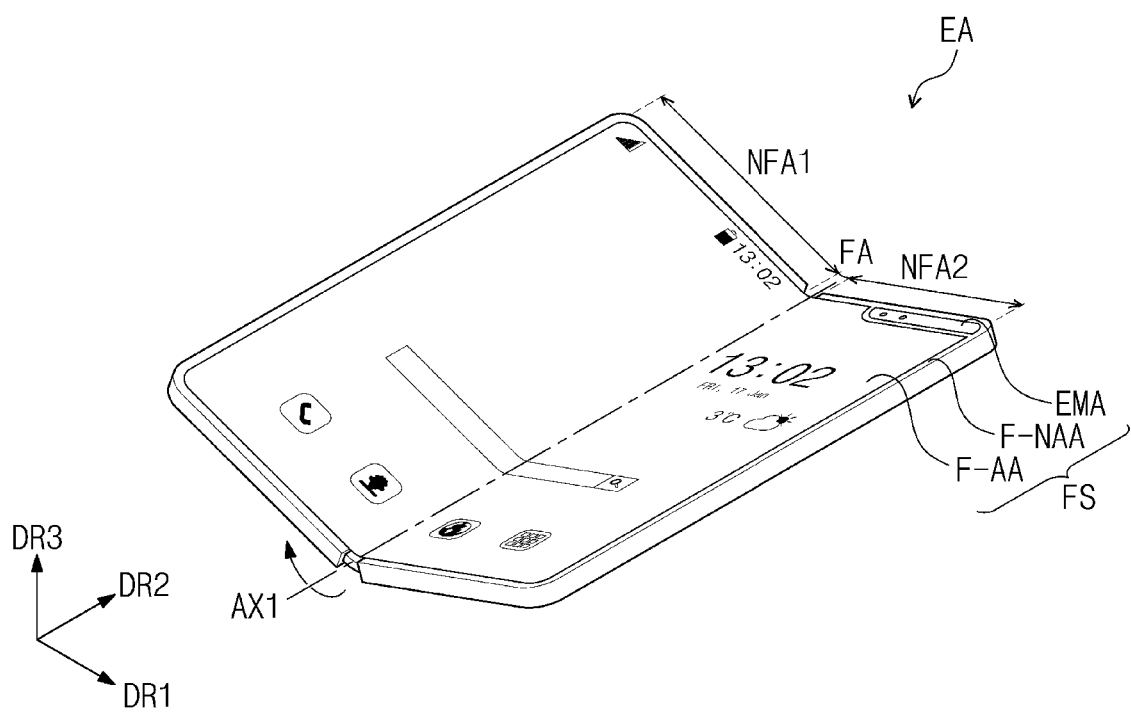
FIG. 1B is a schematic perspective view of an electronic apparatus according to an embodiment.
Figure 1C:
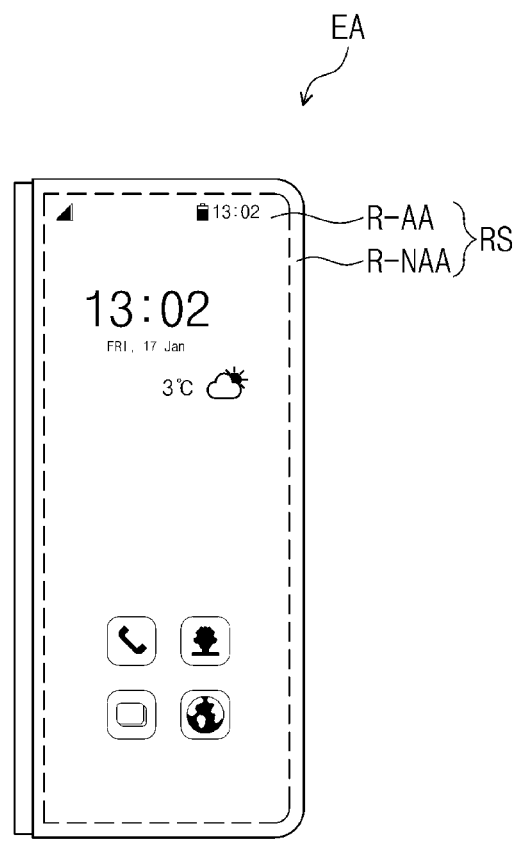
FIG. 1C is a schematic plan view of an electronic apparatus according to an embodiment in a folded state.
Figure 1D:
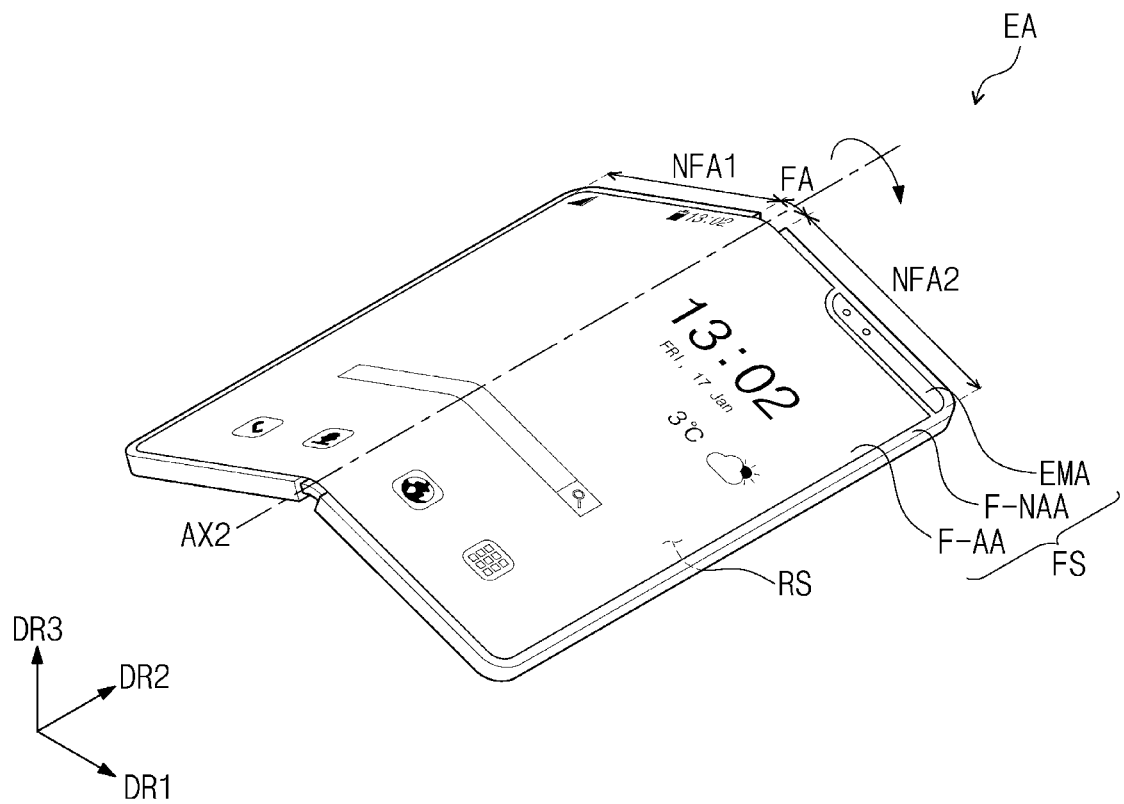
FIG. 1D is a schematic perspective view of an electronic apparatus according to an embodiment.

FIG. 1A is a schematic perspective view of an electronic apparatus according to an embodiment in an unfolded state. FIG. 1B is a schematic perspective view of an electronic apparatus according to an embodiment. FIG. 1C is a schematic plan view of an electronic apparatus according to an embodiment in a folded state. FIG. 1D is a schematic perspective view of an electronic apparatus according to an embodiment.

Referring to FIG. 1A, an electronic apparatus EA may be a device activated by an electrical signal. The electronic apparatus EA may include various embodiments. For example, the electronic apparatus EA may include a tablet computer, a laptop, a computer, a smart television, and the like. In the embodiment, a smart phone is illustrated as an example of the electronic apparatus EA.

The electronic apparatus EA may display an image IM in a third direction DR3 on the first display surface FS parallel to the plane formed by the first direction DR1 and the second direction DR2. The first display surface FS on which the image IM is displayed may correspond to a front surface of the electronic apparatus EA. The image IM may include both moving images and still images. In FIG. 1A, as an example of the image IM, an Internet search window and a clock window are illustrated.

In the embodiment, a front surface (or an upper surface) and a back surface (or a lower surface) of each component are defined on the basis of a direction in which the image IM is displayed. The front surface and the rear surface oppose each other in the third direction DR3 and the normal direction of each of the front surface and the rear surface may be parallel to the third direction DR3.

The separation distance of the front surface and the rear surface in the third direction DR3 may correspond to the thickness/height of the electronic apparatus EA in the third direction DR3. The directions indicated by the first to third directions DR1, DR2, and DR3 are relative directions, and may be defined differently.

The electronic apparatus EA may sense an external input applied from the outside. The external input may include various forms of input provided from the outside of the electronic apparatus EA.

For example, the external input may include not only a contact by a part of a user's body, such as a hand, but also an external input applied from an object that is in close proximity, or approach to the electronic apparatus EA within a distance (for example, hovering). Also, the external input may have various forms such as force, pressure, temperature, light, and the like.

In FIG. 1A, an external input through a pen SP is illustrated. Although not illustrated, the pen SP may be mounted and unmounted inside or on the outside of the electronic apparatus EA, and the electronic apparatus EA may provide or receive a signal corresponding to the mounting and unmounting of the pen SP.

The electronic apparatus EA according to the embodiment may include the first display surface FS and a second display surface RS. The first display surface FS may include a first active region F-AA, a first peripheral region F-NAA, and an electronic module region EMA. The second display surface RS may be defined as a surface opposing at least a portion of the first display surface FS.

The first active region F-AA may be a region activated by an electrical signal. The first active region F-AA may be a region on which the image IM is displayed and which may sense an external input of various forms. The first peripheral region F-NAA may be adjacent to the first active region F-AA. The first peripheral region F-NAA may have a predetermined color. The first peripheral region F-NAA may surround the first active region F-AA. Accordingly, the shape of the first active region F-AA may be substantially defined by the first peripheral region F-NAA. However, the embodiments are not limited thereto. The first peripheral region F-NAA may be disposed adjacent to only one side of the first active region F-AA, or may be omitted. The electronic apparatus EA may include other embodiments and is not limited to any one embodiment.

In the electronic module region EMA, various electronic modules may be disposed. For example, the electronic module may include at least one of a camera, a speaker, a light sensing sensor, and a heat sensing sensor. The electronic module region EMA may sense an external object through the display surfaces FS and RS, and/or may provide a sound signal such as voice to the outside through the display surfaces FS and RS. An electronic module region EMA may include multiple components, and is not limited to any one embodiment.

The electronic module region EMA may be surrounded by the first active region F-AA and the first peripheral region F-NAA. However, the embodiments are not limited thereto. The electronic module region EMA may be disposed inside the first active region F-AA, and is not limited to any one embodiment.

The electronic apparatus EA according to the embodiment may include at least one folding region FA, and non-folding regions NFA1 and NFA2 extended from the folding region FA. The non-folding regions NFA1 and NFA2 may be spaced apart from each other with the folding region FA therebetween.

Referring to FIG. 1B, the electronic apparatus EA includes an imaginary first folding axis AX1 extended in the second direction DR2. The first folding axis AX1 may be extended in the second direction DR2 on the first display surface FS. In the embodiment, the non-folding regions NFA1 and NFA2 may be extended from the folding region FA with the folding region FA therebetween. For example, a first non-folding region NFA1 may be extended from a side of the folding region FA in the first direction DR1, and a second non-folding region NFA2 may be extended from the other side of the folding region FA in the first direction DR1.

The electronic apparatus EA may be folded with respect to the first folding axis AX1 and transformed into an in-folding state. In the in-folding state, a region of the first display surface FS overlapping the first non-folding region NFA1 faces another region of the first display surface FS overlapping the second non-folding region NFA2.

Referring to FIG. 1C, according to an embodiment, in the in-folding state, the second display surface RS of the electronic apparatus EA may be visible to a user. The second display surface RS may include a second active region R-AA for displaying an image. The second active region R-AA may be a region activated by an electrical signal. The second active region R-AA may be a region on which an image is displayed and which may sense external inputs of various forms.

A second peripheral region R-NAA is adjacent to the second active region R-AA. The second peripheral region R-NAA may have a color. The second peripheral region R-NAA may surround the second active region R-AA. The second display surface RS may further include an electronic module region which includes an electronic module including various components, and is not limited to any one embodiment.

Referring to FIG. 1D, the electronic apparatus EA according to an embodiment includes an imaginary second folding axis AX2 extended in the second direction DR2. The second folding axis AX2 may be extended along the second direction DR2 on the second display surface RS.

The electronic apparatus EA may be folded with respect to the second folding axis AX2 and transformed into an out-folding state. In the out-folding state a region of the second display surface RS overlapping the first non-folding region NFA1 faces another region thereof overlapping the second non-folding region NFA2.

However, the embodiments are not limited thereto. The electronic apparatus EA may be folded with respect to multiple folding axes such that portions of the first display surface FS and/or the second display surface RS may be folded to face each other, and the number of folding axes and the number of non-folding region accordingly are not limited to any one embodiment.

Figure 2A:
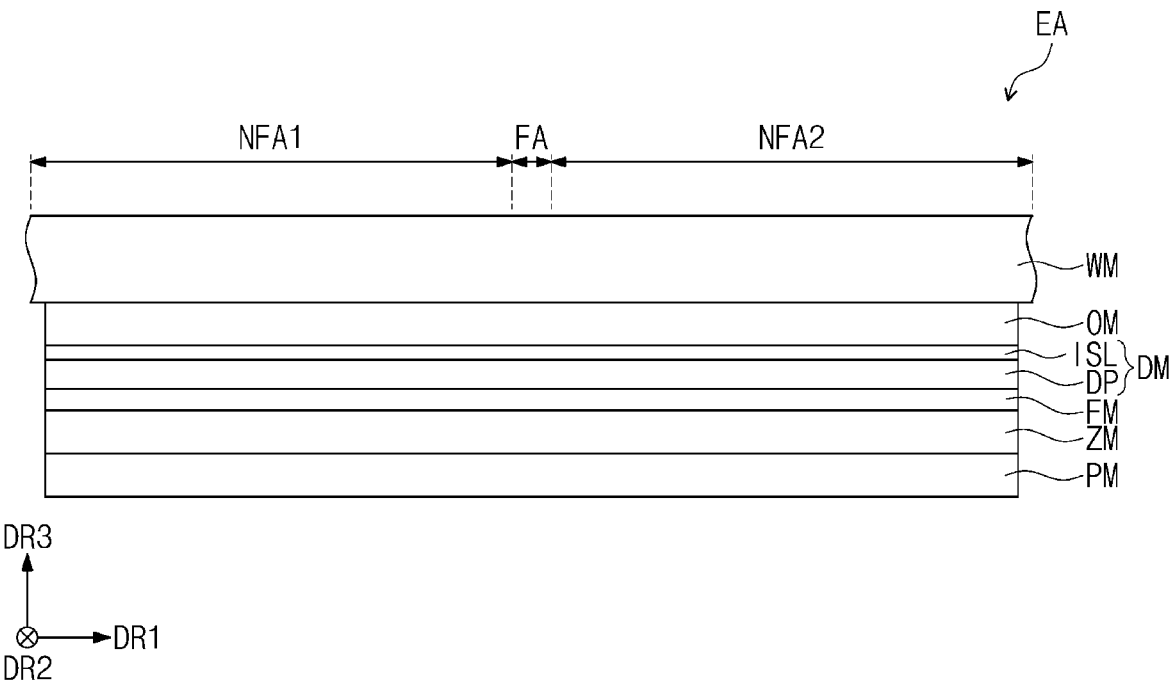
FIG. 2A is a schematic cross-sectional view of an electronic apparatus according to an embodiment.
Figure 2B:
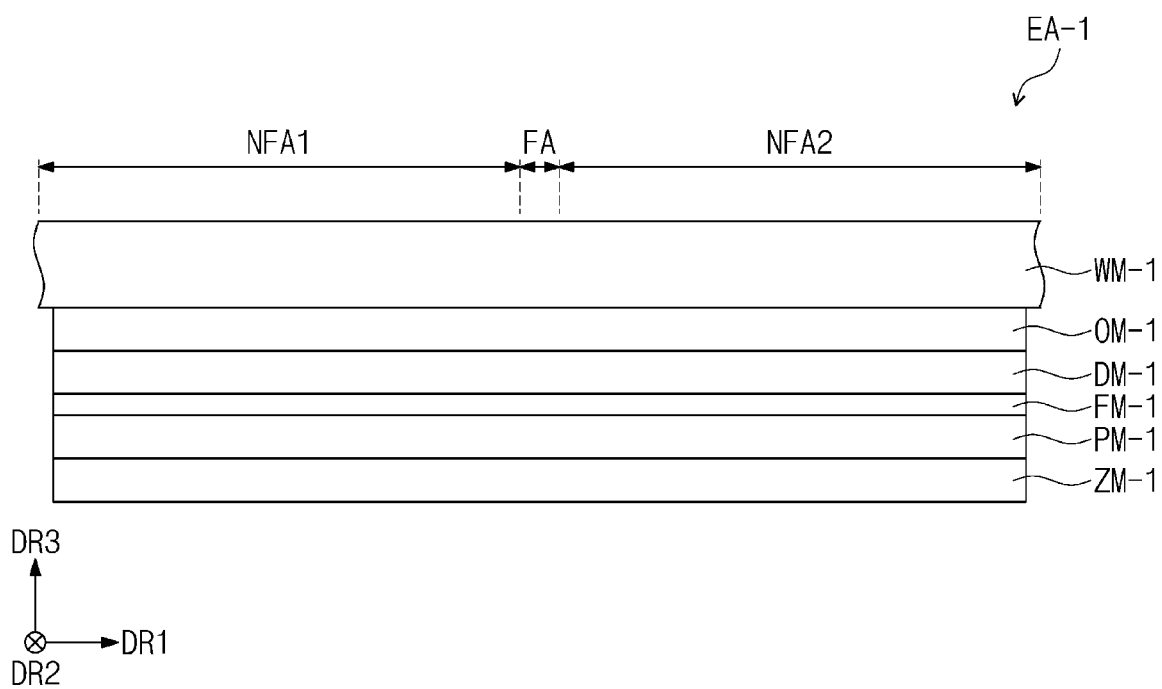
FIG. 2B is a schematic cross-sectional view of an electronic apparatus according to an embodiment.
Figure 2C:
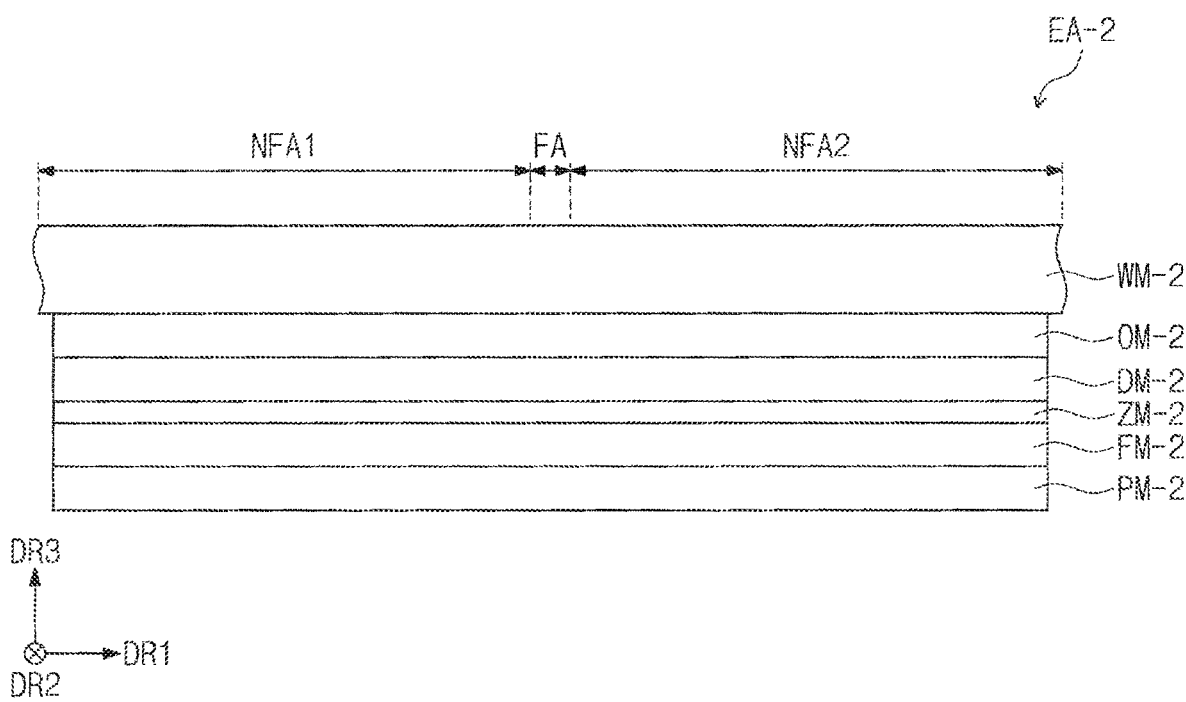
FIG. 2C is a schematic cross-sectional view of an electronic apparatus according to an embodiment.

FIG. 2A is a schematic cross-sectional view of the electronic apparatus EA according to an embodiment. FIG. 2B is a schematic cross-sectional view of an electronic apparatus EA-1 according to an embodiment. FIG. 2C is a schematic cross-sectional view of an electronic apparatus EA-2 according to an embodiment.

Referring to FIG. 2A, the electronic apparatus EA according to the embodiment may include a window WM, an optical member OM, a display module DM, a lower film FM, a digitizer ZM, and a protective member PM. However, the embodiments are not limited thereto. The optical member OM and/or the lower film FM may be omitted.

The window WM is disposed on the display module DM. The window WM provides the display surfaces FS and RS of the electronic apparatus EA and protects the display module DM. The window WM may include a material having a high light transmittance rate. For example, the window WM may include a glass substrate, a sapphire substrate, or a plastic film. The window WM may have a multi-layered structure or a single-layered structure. For example, the window WM may have a laminated structure in which multiple plastic films are adhered to each other with an adhesive, or a laminated structure in which a glass substrate and a plastic film are adhered to each other with an adhesive.

A region of the window WM through which light generated from the display module DM is transmitted may be defined as the first active region F-AA of the first display surface FS, and a bezel region of the window WM may be defined as the first peripheral region F-NAA. Also, the other region of the window WM through which light generated from the display module DM is transmitted may be defined as the second active region R-AA of the second display surface RS, and a bezel region of the window WM may be defined as the second peripheral region R-NAA.

Although not illustrated, the window WM may further include functional layers to protect the window WM. For example, the functional layers may include at least one of a fingerprint prevention layer and an impact absorbing layer, but are not limited thereto.

The optical member OM may be disposed on a lower portion of the window WM. The optical member OM may reduce the external light reflectance rate of the display module DM for light incident on the display module DM. For example, the optical member OM may include at least one of an anti-reflection film, a polarizing film, a color filter, and a gray filter.

The display module DM may function as an output device. For example, the display module DM may display an image on the active regions F-AA and R-AA and a user may obtain information through the image. The display module DM may function as an input device for sensing an external input applied to the active regions F-AA and R-AA. The display module DM according to an embodiment may include a display panel DP and an input sensing panel ISL.

The lower film FM is disposed on the lower portion of the display module DM. The lower film FM may reduce stress applied to the display module DM when the electronic apparatus EA is folded. Also, the lower film FM may prevent external moisture from penetrating the display module DM and absorb external impacts.

The lower film FM may include a plastic film as a base layer. The lower film FM may include a plastic film containing any material selected from the group consisting of polyethersulfone (PES), polyacrylate, polyetherimide (PEI), polyethylenenaphthalate (PEN), polyethyleneterephthalate (PET), polyphenylene sulfide (PPS), polyarylate, polyimide (PI), polycarbonate (PC), poly (arylene ethersulfone), or a combination thereof.

The material constituting the lower film FM is not limited to plastic resins, and may include an organic/inorganic composite material. The lower film FM may include a porous organic layer, and an inorganic material filling in the pores of the organic layer.

The lower film FM may further include a functional layer formed on the plastic film. The functional layer may include a resin layer. The functional layer may be formed by coating.

The digitizer ZM may be disposed on a lower portion of the display module DM. The digitizer ZM may sense a signal transmitted by the pen SP (refer to FIG. 1A) among external inputs. The digitizer ZM will be described later.

The protection member PM may be disposed on a lower portion of the display module DM. The protective member PM may include at least one functional layer for protecting the display module DM. The functional layer may be, for example, a heat dissipating layer, a light blocking layer, or a cushion layer. The light blocking layer and the cushion layer may perform the same function as a light blocking layer and a cushion layer to be included inside the digitizer ZM to be described below may perform.

The heat dissipating layer may effectively dissipate heat generated in the display module DM. The heat dissipating layer may include at least any one of graphite, copper (Cu), or aluminum (Al), all of which have good heat dissipating properties, but is not limited thereto. The heat dissipating layer may not only improve heat dissipating properties, but may also have electromagnetic wave shielding properties or electromagnetic wave absorbing properties.

However, the embodiments are not limited thereto. Any of the light blocking layer, the heat dissipating layer, or the cushion layer may be omitted, or multiple layers may be provided as a single layer, but the embodiments are not limited to any one embodiment.

The electronic apparatus EA according to the embodiment may have a structure in which the protective member PM, the digitizer ZM, the lower film FM, the display module DM, the optical member OM, and the window WM are sequentially stacked along the third direction DR3.

Although not illustrated, the coupling between components included in the electronic apparatus EA may be achieved by adhesive layers disposed between the components. Hereinafter, an adhesive layer to be described in the embodiments may be an optically clear adhesive (OCA) film, an optically clear resin (OCR), or a pressure sensitive adhesive (PSA) film. The adhesive layer may include a light-curable adhesive material or a heat-curable adhesive material, but the material of the adhesive layer is not limited. However, a separate adhesive layer may not be disposed on upper and lower portions of the digitizer ZM, and an adhesive layer included inside the digitizer ZM will be described below.

Components included in the electronic apparatuses EA-1 and EA-2 of FIG. 2B and FIG. 2C and components in the electronic apparatus EA of FIG. 2A may be the same, and only the difference in stacking order will be described.

Referring to FIG. 2B, the electronic apparatus EA-1 according to the embodiment may have a structure in which a digitizer ZM-1, a protective member PM-1, a lower film FM-1, a display module DM-1, an optical member OM-1, and a window WM-1 are sequentially stacked along the third direction DR3.

Referring to FIG. 2C, the electronic apparatus EA-2 according to the embodiment may have a structure in which a protective member PM-2, a lower film FM-2, a digitizer ZM-2, a display module DM-2, an optical member OM-2, and a window WM-2 are sequentially stacked along the third direction DR3.

Figure 3A:
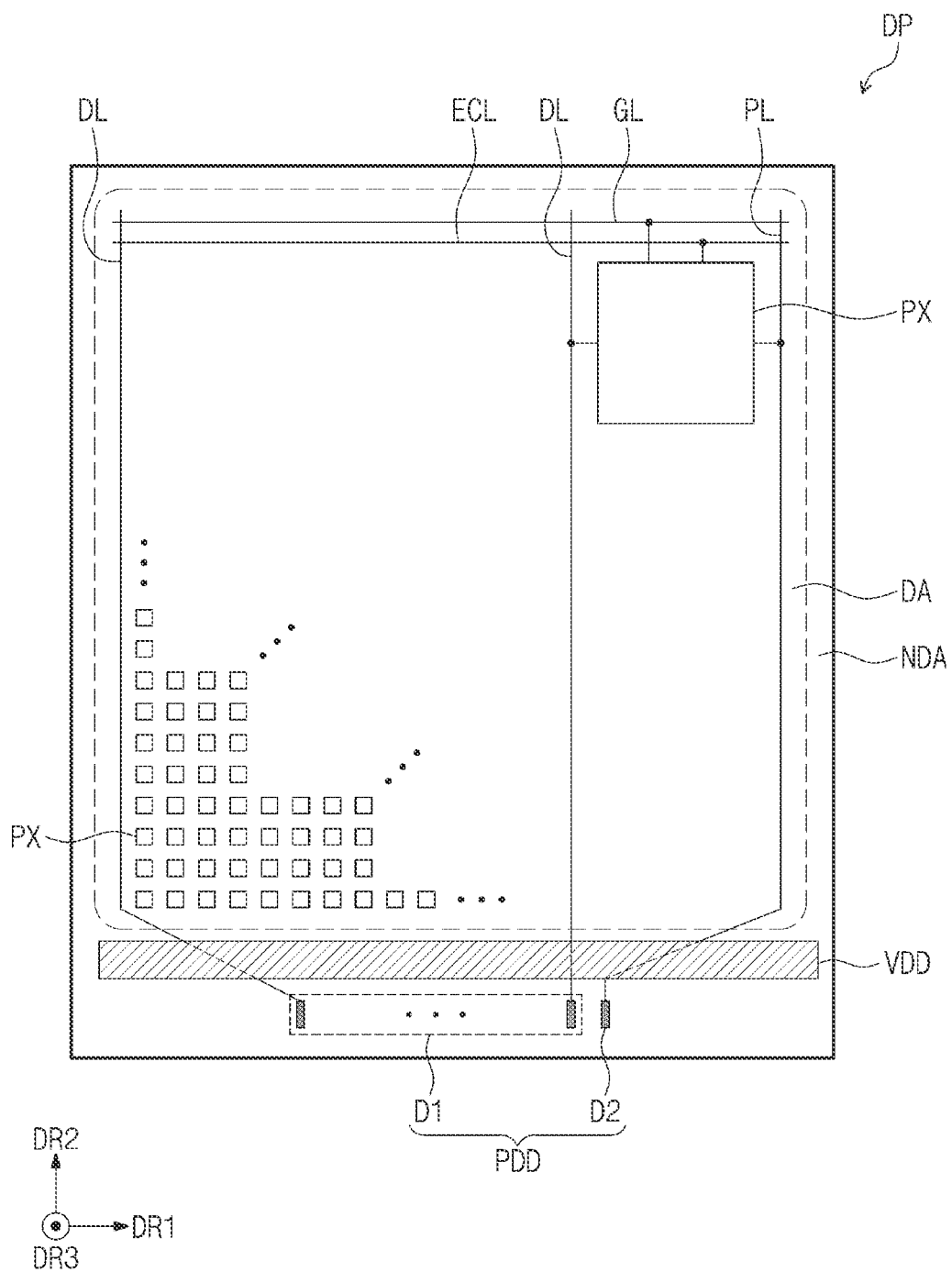
FIG. 3A is a schematic plan view of a display panel according to an embodiment.
Figure 3B:
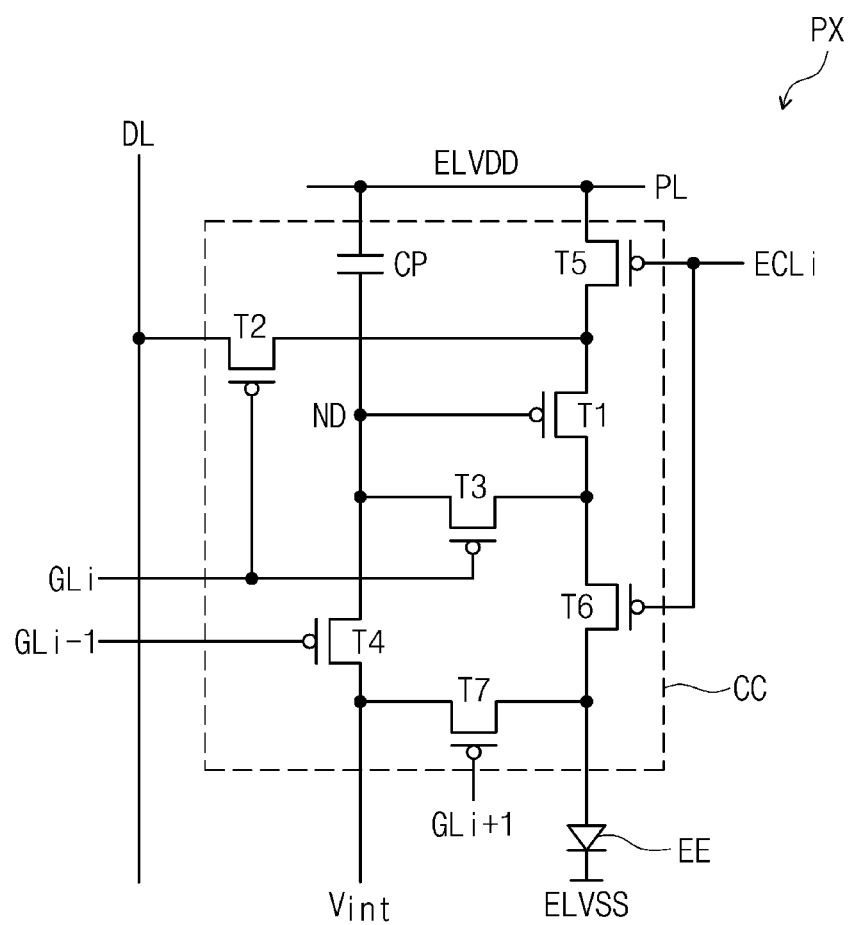
FIG. 3B is an equivalent circuit diagram of a pixel according to an embodiment.
Figure 4:
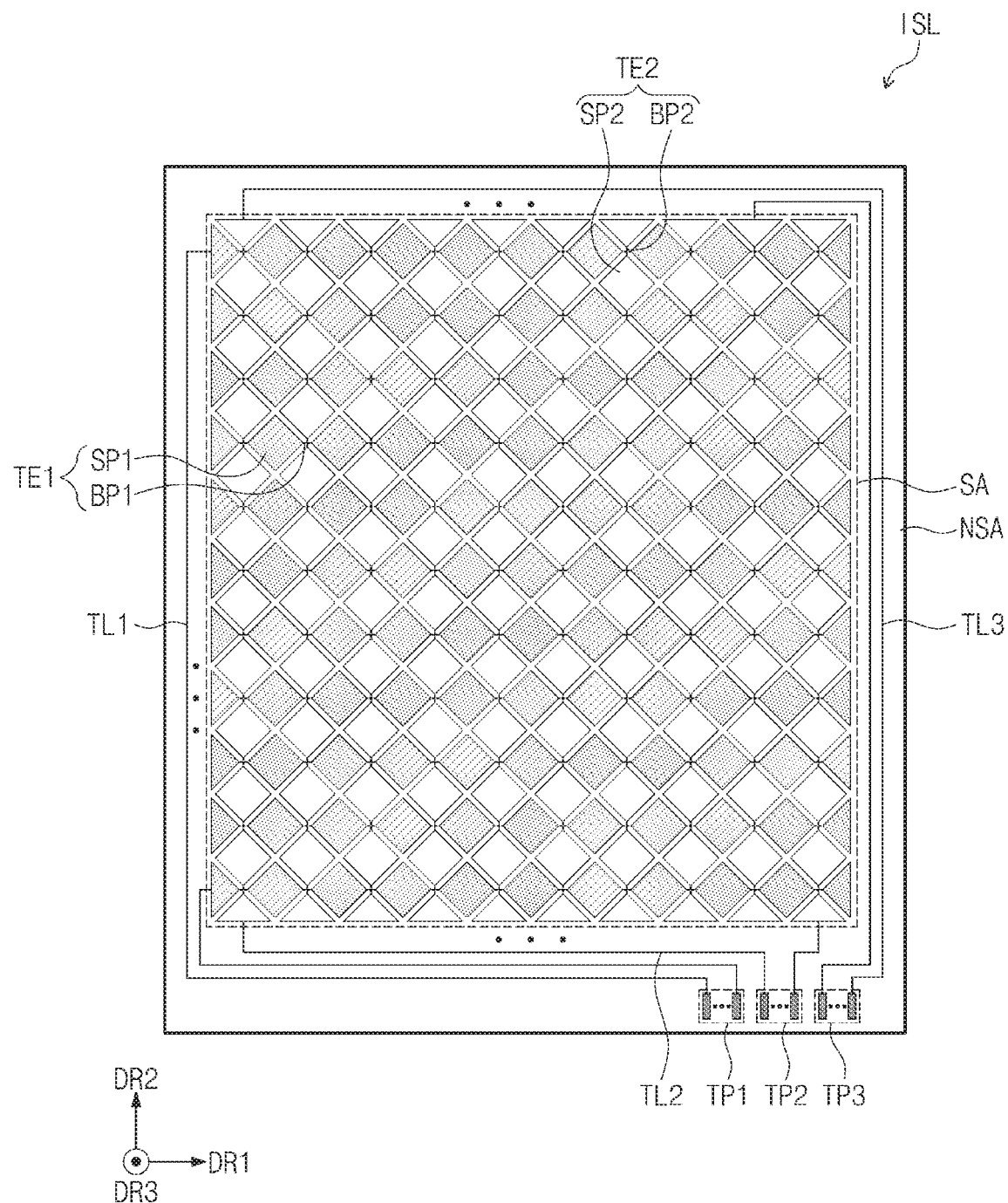
FIG. 4 is a schematic plan view of an input sensing panel according to an embodiment.

FIG. 3A is a schematic plan view of the display panel DP according to an embodiment. FIG. 3B is an equivalent circuit diagram of the pixel PX according to an embodiment. FIG. 4 is a schematic plan view of the input sensing panel ISL according to an embodiment. The same reference numerals are used for the same components as those of FIG. 1A to FIG. 2C, and redundant descriptions thereof are omitted.

Referring to FIG. 3A, the display panel DP may include pixels PX, signal lines GL, DL, PL, and ECL, and display pads PDD.

A display region DA of the display panel DP may be a region on which an image IM is displayed, and a non-display region NDA may be a region on which a driving circuit, a driving line, or the like may be disposed. The display region DA may overlap at least a portion of the active regions F-AA and R-AA of the electronic apparatus EA. Also, the non-display region NDA may overlap the peripheral regions F-NAA and R-NAA of the electronic apparatus EA.

The signal lines GL, DL, PL, and ECL are electrically connected to the pixels PX and transmit electrical signals to the pixels PX. Among signal lines included in the display panel DP, a scan line GL, a data line DL, a power supply line PL, and a light emission control line ECL are illustrated. However, the embodiments are not limited thereto. The signal lines may further include an initialization voltage line, and are not limited to any one embodiment.

The pixels PX may be spaced apart from each other along the first direction DR1 and the second direction DR2 and may have a matrix shape on a in a plan view.

Referring to FIG. 3B, an equivalent circuit diagram of a pixel PX is illustrated. FIG. 3B illustrates the pixel PX electrically connected to an i-th scan line GLi and to an i-th light emission control line ECLi.

The pixel PX may include a light emitting element EE and a pixel circuit CC. The pixel circuit CC may include transistors T1 to T7 and a capacitor CP. The transistors T1 to T7 may be formed through a low temperature polycrystalline silicon (LTPS) process or a low temperature polycrystalline oxide (LTPO) process.

The pixel circuit CC controls the electric current flowing through the light emitting element EE, corresponding to a data signal. The light emitting element EE may emit light to a predetermined luminance corresponding to the electric current controlled by the pixel circuit CC. The level of a first power ELVDD may be set to be higher than the level of a second power ELVSS. The light emitting element EE may include an organic light emitting element or a quantum dot light emitting element.

Each of the transistors T1 to T7 may each include an input electrode (or a source electrode), an output electrode (or a drain electrode), and a control electrode (or a gate electrode). In the disclosure, any one of the input electrode and the output electrode may be referred to as a first electrode, and the other may be referred to as a second electrode for convenience.

A first electrode of a first transistor T1 is electrically connected to the first power ELVDD via a fifth transistor T5, and a second electrode of the first transistor T1 is electrically connected to an anode electrode of the light emitting element EE via a sixth transistor T6. The first transistor T1 may be referred to as a driving transistor in the disclosure.

The first transistor T1 controls the electric current flowing through the light emitting element EE corresponding to a voltage applied to a control electrode of the first transistor T1.

A second transistor T2 is electrically connected between the data line DL and the first electrode of the first transistor T1. A control electrode of the second transistor T2 is electrically connected to the i-th scan line GLi. When an i-th scan signal is provided to the i-th scan line GLi, the second transistor T2 is turned on to electrically connect the data line DL and the first electrode of the first transistor T1.

A third transistor T3 is electrically connected between the second electrode of the first transistor T1 and the control electrode of the first transistor T1. A control electrode of the third transistor T3 is electrically connected to the i-th scan line GLi. When an i-th scan signal is provided to the i-th scan line GLi, the third transistor T3 is turned on to electrically connect the second electrode of the first transistor T1 and the control electrode of the first transistor T1. Accordingly, when the third transistor T3 is turned on, the first transistor T1 becomes a diode-connected transistor.

A fourth transistor T4 is electrically connected between a node ND and an initialization power generator (not shown). The initialization power generator generates an initialization voltage Vint. A control electrode of the fourth transistor T4 is electrically connected to an (i−1)-th scan line GLi−1. When an (i−1)-th scan signal is provided to the (i−1)-th scan line GLi, the fourth transistor T4 is turned on to provide an initialization voltage Vint to the node ND.

A fifth transistor T5 is electrically connected between the power supply line PL and the first electrode of the first transistor T1. A control electrode of the fifth transistor T5 is electrically connected to the i-th light emission control line ECLi.

A sixth transistor T6 is electrically connected between the second electrode of the first transistor T1 and the anode electrode of the light emitting element EE. A control electrode of the sixth transistor T6 is electrically connected to the i-th light emission control line ECLi.

A seventh transistor T7 is electrically connected between the initialization power generator (not shown) and the anode electrode of the light emitting element EE. A control electrode of the seventh transistor T7 is electrically connected to an (i+1)-th scan line GLi+1. When an (i+1)-th scan signal is provided to the (i+1)-th scan line GLi+1, the seventh transistor T7 is turned on to provide the initialization voltage Vint to the anode electrode of the light emitting element EE.

The seventh transistor T7 may improve the capability of the pixel PX to express black. When the seventh transistor T7 is turned on, a parasitic capacitor (not shown) of the light emitting element EE is discharged. Therefore, the light emitting element EE may be prevented from light emission due to a leakage current from the first transistor T1, so that the black expression capability may be improved.

FIG. 3B illustrates the control electrode of the seventh transistor T7 being connected to the (i+1)-th scan line GLi+1, but the embodiments are not limited thereto. In other embodiments, the control electrode GE of the seventh transistor T7 may be connected to the i-th scan line GLi or the (i−1)-th scan line GLi−1.

The capacitor CP is disposed between the power supply line PL and the node ND. The capacitor CP stores a voltage corresponding to a data signal. When the fifth transistor T5 and the sixth transistor T6 are turned on, the electric current flowing in the first transistor T1 may be determined according to the voltage stored in the capacitor CP.

In the embodiments, the circuit of the pixel PX is not limited to the equivalent circuit illustrated in FIG. 3B. In other embodiments, the pixel PX may be implemented in various forms for emitting the light emitting element EE. Although FIG. 3B illustrates a PMOS as a reference, the embodiments are not limited thereto. In other embodiments, the pixel circuit CC may be formed of an NMOS. The pixel circuit CC may also include a combination of an NMOS and a PMOS.

Referring to FIG. 3A, a power supply pattern VDD is disposed in the non-display region NDA. In an embodiment, the power supply pattern VDD is connected to power supply lines PL. The display panel DP includes the power supply pattern VDD, thereby providing the same first power signal to the pixels PX.

The display pads PDD may include first pads D1 and a second pad D2. The first pads D1 may each be electrically connected to at least one of the data lines DL. The second pad D2 is electrically connected to the power supply pattern VDD and electrically connected to at least one of the power supply line PL. The display panel DP may provide electrical signals provided from the outside through the display pads PDD to the pixels PX. However, the embodiments are not limited thereto. The display pads PDD may include other pads for receiving other electrical signals in addition to the first pads D1 and the second pad D2, and are not limited to any one embodiment.

Referring to FIGS. 2A and 4, the input sensing panel ISL may be disposed on the display panel DP. The input sensing panel ISL may be attached to the display panel DP through a separate adhesive layer. However, the embodiments are not limited thereto. The input sensing panel ISL may be directly formed on the display panel DP by a continuous process, and is not limited to any one embodiment.

The input sensing panel ISL may include a first sensing electrode TE1, a second sensing electrode TE2, trace lines TL1, TL2, and TL3, and sensing pads TP1, TP2, and TP3. On the input sensing panel ISL, a sensing region SA and a non-sensing region NSA may be defined. The non-sensing region NSA may surround the sensing region SA. The sensing region SA may be a sensing area in which an input applied from the outside is sensed. The sensing region SA may overlap the display region DA of the display panel DP.

The input sensing panel ISL may sense an external input by a self-capacitance type method or a mutual capacitance type method. The first sensing electrode TE1 and the second sensing electrode TE2 may be variously modified, disposed, and connected according to the type of sensing method.

The first sensing electrode TE1 may include first sensing patterns SP1 and first bridge patterns BP1. The first sensing electrode TE1 may be extended along the first direction DR1 and arranged along the second direction DR2. The first sensing patterns SP1 may be spaced apart and arranged along the first direction DR1. At least one first bridge pattern BP1 may be disposed between two first sensing patterns SP1 adjacent to each other.

The second sensing electrode TE2 may include second sensing patterns SP2 and second bridge patterns BP2. The second sensing electrode TE2 may be extended along the second direction DR2 and arranged along the first direction DR1. The second sensing patterns SP2 may be spaced apart and arranged along the second direction DR2. At least one second bridge pattern BP2 may be disposed between two second sensing patterns SP2 adjacent to each other.

The trace lines TL1, TL2, and TL3 are disposed in the non-sensing region NSA. The trace lines TL1, TL2, and TL3 may include a first trace line TL1, a second trace line TL2, and a third trace line TL3.

The first trace line TL1 may be electrically connected to an end of the first sensing electrode TE1. The second trace line TL2 may be electrically connected to an end of the second sensing electrode TE2. The third trace line TL3 may be electrically connected to the other end of the second sensing electrode TE2 in a portion opposing the end of the second sensing electrode TE2 electrically connected to the second trace line TL2.

According to the embodiments, the second sensing electrode TE2 may be connected to the second trace line TL2 and to the third trace line TL3. Accordingly, sensitivity may be uniformly maintained for the second sensing electrode TE2, which may be relatively longer than the first sensing electrode TE1. The embodiments are not limited thereto. The third trace line TL3 may be omitted, and is not limited to any one embodiment.

The sensing pads TP1, TP2, and TP3 are disposed in the non-sensing region NSA. The sensing pads TP1, TP2, TP3 may include a first sensing pads TP1, a second sensing pads TP2, and a third sensing pads TP3. The first sensing pad TP1 is electrically connected to the first trace line TL1 to be electrically connected to the first sensing electrode TE1. The second sensing pad TP2 is electrically connected to the second trace line TL2, and the third sensing pad TP3 is electrically connected to the third trace line TL3. Therefore, the second sensing pad TP2 and the third sensing pad TP3 are electrically connected to a corresponding second sensing electrode TE2.

Figure 5:
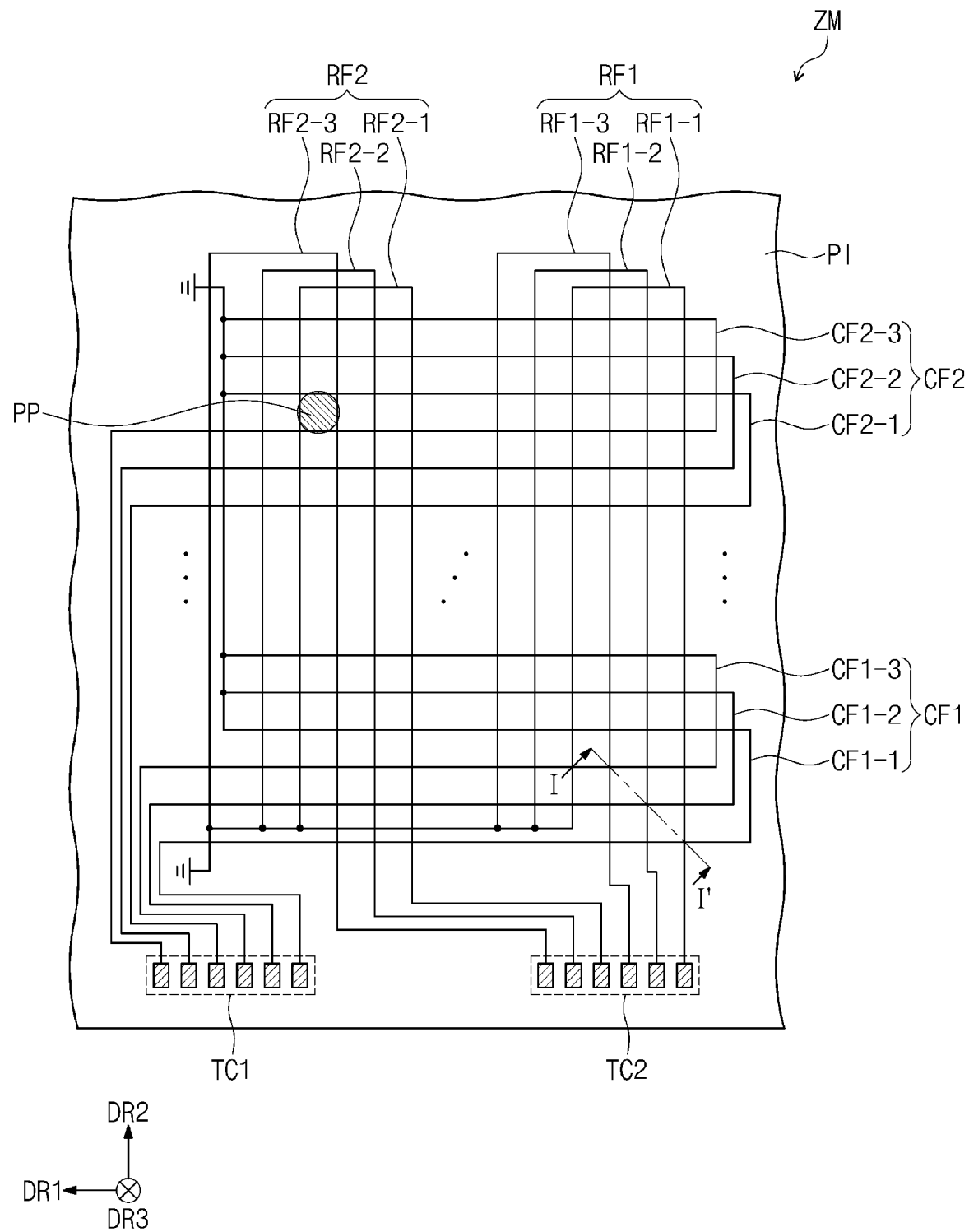
FIG. 5 is a schematic plan view of a digitizer according to an embodiment.
Figure 6A:
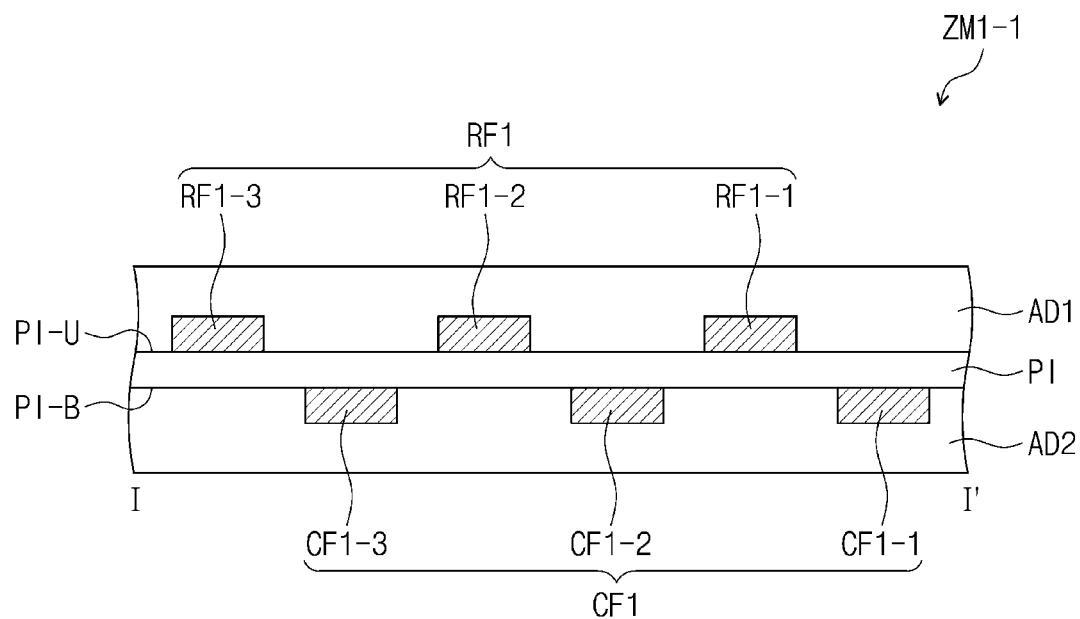
FIG. 6A and FIG. 6B are schematic cross-sectional views of a digitizer according to an embodiment.
Figure 6B:
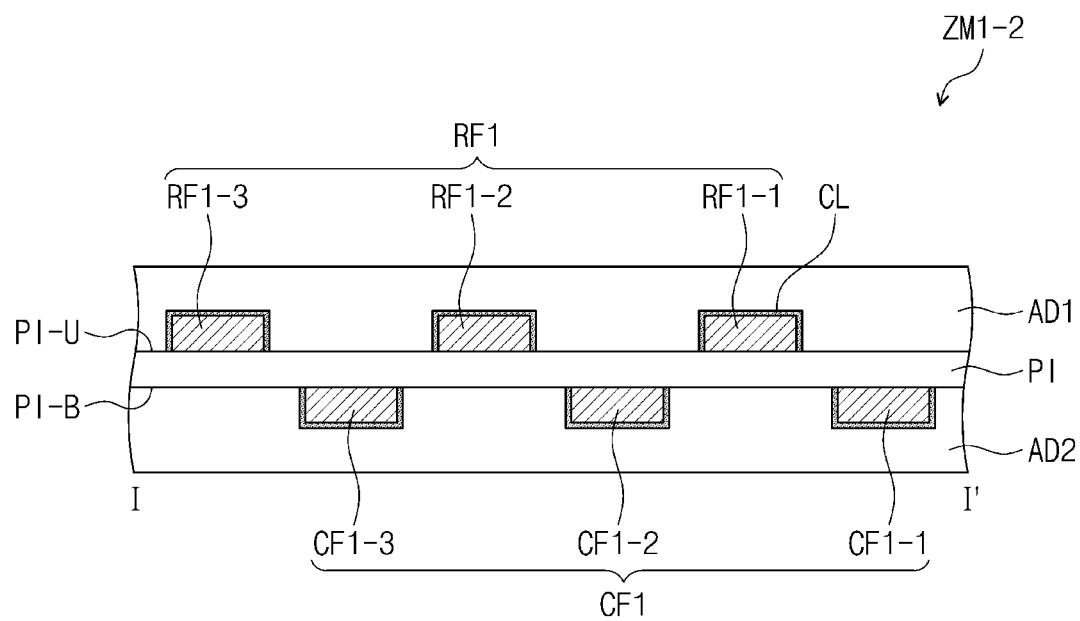

FIG. 5 is a schematic plan view of the digitizer ZM according to an embodiment. FIG. 6A and FIG. 6B are schematic cross-sectional views of the digitizers ZM1-1 and ZM1-2 according to an embodiment. FIG. 6A and FIG. 6B are schematic cross-sectional views taken along line I-I' of FIG. 5. Referring to FIG. 5 to FIG. 6B, a basic structure of the digitizers ZM, ZM1-1 and ZM1-2 will be described. The same reference numerals are used for the same components as those of FIG. 1A to FIG. 4, and redundant descriptions thereof are omitted.

The digitizer ZM according to an embodiment may sense an external input by an ElectroMagnetic Resonance (EMR) method. According to the electromagnetic resonance (EMR) method, a magnetic field is generated in a resonance circuit formed inside the pen SP (refer to FIG. 1A), and then the magnetic field induces a signal in coils included in the digitizer ZM. The position of the pen SP may be detected based on the signal induced in the coils.

Referring to FIG. 5, the digitizer ZM may include a base layer PI, digitizer sensors CF1, CF2, RF1, and RF2, and digitizer pads TC1 and TC2.

A digitizer ZM may include the digitizer sensors RF1, RF2, CF1, and CF2 disposed on the base layer PI. The base layer PI may be a base layer on which the digitizer sensors CF1, CF2, RF1, and RF2 are disposed. The base layer PI may include an organic material. For example, the base layer PI may include polyimide (PI).

Each of first digitizer sensors RF1 and RF2 may include first sensing coils RF1-1, RF1-2, RF1-3, RF2-1, RF2-2, and RF2-3, and each of second digitizer sensors CF1 and CF2 may include second sensing coils CF1-1, CF1-2, CF1-3, CF2-1, CF2-2, and CF2-3. The first sensing coils RF1-1, RF1-2, RF1-3, RF2-1, RF2-2, and RF2-3 and the second sensing coils CF1-1, CF1-2, CF1-3, CF2-1, CF2-2, and CF2-3 may include a metal. In an embodiment, the first sensing coils RF1-1, RF1-2, RF1-3, RF2-1, RF2-2, and RF2-3 and the second sensing coils CF1-1, CF1-2, CF1-3, CF2-1, CF2-2, and CF2-3 may include copper (Cu).

The first sensing coils RF1-1, RF1-2, RF1-3, RF2-1, RF2-2, and RF2-3 may be extended in the second direction DR2. The first sensing coils RF1-1, RF1-2, RF1-3, RF2-1, RF2-2, and RF2-3 may be arranged spaced apart from each other along the first direction DR1.

The second sensing coils CF1-1, CF1-2, CF1-3, CF2-1, CF2-2, and CF2-3 may be extended in the first direction DR1. The second sensing coils CF1-1, CF1-2, CF1-3, CF2-1, CF2-2, and CF2-3 may be arranged spaced apart from each other along the second direction DR2.

The first digitizer sensors RF1 and RF2 may correspond to input coils of the electromagnetic resonance type digitizer ZM, and the second digitizer sensors CF1 and CF2 may correspond to output coils of the electromagnetic resonance type digitizer ZM.

The first sensing coils RF1-1, RF1-2, RF1-3, RF2-1, RF2-2, and RF2-3 and the second sensing coils CF1-1, CF1-2, CF1-3, CF2-1, CF2-2, and CF2-3 may be disposed insulated from each other in the base layer PI. Each of the first sensing coils RF1-1, RF1-2, RF1-3, RF2-1, RF2-2, and RF2-3 may be electrically connected to corresponding first digitizer pads TC1, and each of the second sensing coils CF1-1, CF1-2, CF1-3, CF2-1, CF2-2, and CF2-3 may be electrically connected to corresponding second digitizer pads TC2.

Each of the first sensing coils RF1-1, RF1-2, RF1-3, RF2-1, RF2-2, and RF2-3 may receive one of the scan signals which are activated in different intervals. Each of the first sensing coils RF1-1, RF1-2, RF1-3, RF2-1, RF2-2, and RF2-3 may generate a magnetic field in response to a corresponding scan signal.

When the pen SP (see FIG. 1A) is adjacent to the first sensing coils RF1-1, RF1-2, RF1-3, RF2-1, RF2-2, and RF2-3, a magnetic field induced from the first sensing coils RF1-1, RF1-2, RF1-3, RF2-1, RF2-2, and RF2-3 may resonate with a resonance circuit of the pen SP. The pen SP may generate a resonance frequency. The pen SP may have an LC resonance circuit including an inductor and a capacitor.

The second sensing coils CF1-1, CF1-2, CF1-3, CF2-1, CF2-2, and CF2-3 may output sensing signals according to the resonance frequency of an input means to the second digitizer pads TC2.

The assumed input point PP may be the central portion of a region intersected by the second coil RF2-2 among the first sensing coils RF1-1, RF1-2, RF1-3, RF2-1, RF2-2, and RF2-3 and the second coil CF2-2 among the second sensing coils CF1-1, CF1-2, CF1-3, CF2-1, CF2-2, and CF2-3.

The sensing signal output from the second coil RF2-2 among the first sensing coils RF1-1, RF1-2, RF1-3, RF2-1, RF2-2, and RF2-3 may have a higher level than sensing signals output from the other first sensing coils RF1-1, RF1-2, RF1-3, RF2-1, and RF2-3.

The sensing signal output from the second coil CF2-2 among the second sensing coils (CF1-1, CF1-2, CF1-3, CF2-1, CF2-2, and CF2-3) may have a higher level than sensing signals output the other second sensing coils CF1-1, CF1-2, CF1-3, CF2-1, and CF2-3.

Sensing signals output from the first coil CF2-1 and the third coil CF2-3 among the second sensing coils (CF1-1, CF1-2, CF1-3, CF2-1, CF2-2, and CF2-3) may have a lower level than the sensing signal output from the second coil CF2-2, and may have a higher level than sensing signals output from the rest of the second sensing coils CF1-1, CF1-2, and CF1-3.

Based on the time when the high-level sensing signal output from the second coil CF2-2 was detected and based on the relative position of the second coil CF2-2 with respect to the second sensing coils CF1-1, CF1-2, CF1-3, CF2-1, and CF2-3, the two-dimensional coordinate information of the input point PP of the pen SP (see FIG. 1A) may be calculated.

Referring to FIG. 6A, in an embodiment, a digitizer ZM1-1 may include a first adhesive layer AD1, first sensing coils RF1-1, RF1-2, and RF1-3, the base layer PI, the second sensing coils CF1-1, CF1-2, and CF1-3, and a second adhesive layer AD2 which are sequentially stacked on a cross-section.

The base layer PI according to an embodiment may include a first surface PI-U (front surface), and a second surface PI-B (back surface) opposing the first surface PI-U. The first surface PI-U may be disposed relatively closer to the display module DM compared to the second surface PI-B. On the first surface PI-U (front surface), the first sensing coils RF1-1, RF1-2, and RF1-3 may be disposed, and on the second surface PI-B, the second sensing coils CF1-1, CF1-2, and CF1-3 may be disposed.

In the disclosure, a surface of each of the first sensing coils RF1-1, RF1-2, and RF1-3 and the second sensing coils CF1-1, CF1-2, and CF1-3 that may contact the base layer PI may be named as the lower surface. The other surface, except for the lower surface may be named as the upper surface of the first sensing coils RF1-1, RF1-2, and RF1-3 and the second sensing coils CF1-1, CF1-2, and CF1-3.

In an embodiment, the first adhesive layer AD1 may be disposed on the first surface PI-U, and the second adhesive layer AD2 may be disposed on the second surface PI-B. The digitizer ZM1-1 may be adhered to other components of the electronic apparatus EA (see FIG. 1A) through the first adhesive layer AD1 disposed on the first surface PI-U and/or the second adhesive layer AD2 disposed on the second surface PI-B.

The first adhesive layer AD1 is disposed on the first sensing coils RF1-1, RF1-2, and RF1-3, and may entirely cover (or overlap) the upper surfaces of the first sensing coils RF1-1, RF1-2, and RF1-3. The second adhesive layer AD2 is disposed on the second sensing coils CF1-1, CF1-2, and CF1-3, and may entirely cover (or overlap) the upper surfaces of the second sensing coils CF1-1, CF1-2, and CF1-3.

The opposing surface of the first adhesive layer AD1 may have a smaller surface roughness than the surface the first adhesive layer AD1 contacting the first surface PI-U. The surface roughness may be smaller on the surface of the second adhesive layer AD2 opposing the surface contacting the second surface PI-B. An opposing surface of the second adhesive layer AD2 may have smaller surface roughness than a surface of the second adhesive layer AD2 contacting the second surface PI-B. The flatness of the opposing surfaces of the first adhesive layer AD1 and the second adhesive layer AD2 may be greater than the surfaces of the first adhesive layer AD1 and the second adhesive layer AD2 contacting the base layer PI. Accordingly, the electronic apparatus EA according to an embodiment may not include a separate upper cover layer or adhesive layer between the digitizer ZM1-1 and other components disposed on the upper portion of the digitizer ZM1-1. The electronic apparatus EA according to an embodiment may not include a separate lower cover layer or adhesive layer between the digitizer ZM1-1 and other components disposed on the lower portion of the digitizer ZM1-1.

The first adhesive layer AD1 and the second adhesive layer AD2 may be multi-curing adhesive layers. In the embodiments, a multi-curing adhesive layer refers to an adhesive layer which is substantially fully cured (for example, completely cured) by multiple separate curing processes (hereinafter, referred to as a "multi-curing process"), thereby having adhesion force. The multi-curing adhesive layer may be an adhesive layer about 50% of which is cured by a first curing process, and then, about 100% of which is cured by a subsequent curing process. The first adhesive layer AD1 and the second adhesive layer AD2 may be layers formed of a same composition cured by a multi-curing process.

Each of the first adhesive layer AD1 and the second adhesive layer AD2 according to an embodiment may contain a resin composition, and an adhesive composition including a curing agent. The first adhesive layer AD1 and the second adhesive layer AD2 may be layers formed by curing the adhesive composition.

The resin composition according to an embodiment includes (meth)acrylate and a secondary initiator. In the disclosure, (meth)acrylate represents acrylate or methacrylate. The type of (meta) acrylate included in the resin composition of an embodiment is not specifically limited, and may be, for example, methyl acrylate, ethyl acrylate, propyl acrylate, butyl acrylate, 2-ethylhexyl acrylate, 2-ethylpentyl acrylate, 2-ethylheptyl acrylate, 2-ethylnonyl acrylate, 2-propylhexyl acrylate, 2-propyloctyl acrylate, and the like.

The secondary initiator included in the resin composition of an embodiment may be an initiator which may not be decomposed during a first curing process to go through the second curing process. The type of the secondary initiator is not particularly limited as long as it is a material which is not decomposed during the first curing process, and may be, for example, a photoinitiator which initiates the photopolymerization of a photocurable material. The photoinitiator may be, for example, but not limited to, at least one of benzophenone, bis-acylphosphine oxide, phenylphosphine oxide, monoacrylphosphine, alpha-hydroxyketone, alpha-aminoketone, (o-ethoxycarboxyl) oxime, acetophenone, phenyl glyoxylic, benzyl dimethyl-ketal, Michler's ketone, imidazole, methylidinetrisdimethylaniline, idonium, sulfonium thymonate, sulfonium phosphonate, metallocene, oligomeric alpha-hydroketone, thioxanthone, benzoyl-sulfide, aminobenzoate, and hydroxycyclo hexylphenylketone.

The first adhesive layer AD1 and the second adhesive layer AD2 may further contain an additive which is commonly added as needed. Examples of the additive may be a photosensitizer, a polymerization inhibitor, a leveling agent, a surfactant, an adhesion-imparting agent, a plasticizer, an ultraviolet absorber, an antioxidant, a storage stabilizer, an antistatic agent, an inorganic filler, a pigment, a dye, and the like, but are not limited thereto.

In an embodiment, the first adhesive layer AD1 and the second adhesive layer AD2 may not include an acid component. When the first adhesive layer AD1 and the second adhesive layer AD2, which may directly contact the first sensing coils RF1-1, RF1-2, and RF1-3 and the second sensing coils CF1-1, CF1-2, and CF1-3, do not include an acid component, it is possible to prevent the first sensing coils RF1-1, RF1-2, and RF1-3 and the second sensing coils CF1-1, CF1-2, and CF1-3 from being corroded.

Each of the first adhesive layer AD1 and the second adhesive layer AD2 may have a thickness of in a range of about 10 µm to about 50 µm. When the thickness of each of the first adhesive layer AD1 and the second adhesive layer AD2 is less than about 10 µm, the adhesion force may be degraded. In case that the thickness of each of the first adhesive layer AD1 and the second adhesive layer AD2 is greater than about 50 µm, the thickness of the entire electronic apparatus EA is increased, so that folding properties may be lowered.

The first adhesive layer AD1 and the second adhesive layer AD2 may each have a storage modulus of in a range of about 0.5 MPa to about 5 MPa at about −20° C. In case that the first adhesive layer AD1 and the second adhesive layer AD2 each have a storage modulus in the above range, the folding reliability of the electronic apparatus EA may be ensured.

Referring to FIG. 6B, a digitizer ZM1-2 may further include a plating layer CL formed on upper surfaces of the first sensing coils RF1-1, RF1-2, and RF1-3 and the second sensing coils CF1-1, CF1-2, and CF1-3. In case that the plating layer CL is included, even if the first adhesive layer AD1 and the second adhesive layer AD2 include an acid component, it is possible to prevent the first sensing coils RF1-1, RF1-2, and RF1-3 and the second sensing coils CF1-1, CF1-2, and CF1-3 from being corroded. The plating layer CL may include a material capable of preventing the corrosion of the first sensing coils RF1-1, RF1-2, and RF1-3 and of the second sensing coils CF1-1, CF1-2, and CF1-3. For example, the plating layer CL may include any material selected from Sn, Ag, Au, Ni, or an alloy thereof.

FIG. 7 to FIG. 12 schematically illustrate a cross-section of a digitizer. The same reference numerals are used for the same components as those of FIG. 1A to FIG. 6B, and redundant descriptions thereof are omitted.

Referring to FIG. 7 to FIG. 12, a digitizer according to an embodiment may further include at least one of a shielding layer MP, a magnetic sheet MMP, a cushion layer CSL, a light blocking layer BP1, a first sub-adhesive layer MAD1, and a second sub-adhesive layer MAD2. However, the embodiment is not limited thereto. Any of the shielding layer MP, the magnetic sheet MMP, the cushion layer CSL, the light blocking layer BPI, the first sub-adhesive layer MAD1, and the second sub-adhesive layer MAD2 may be omitted or be further included.

Figure 7:
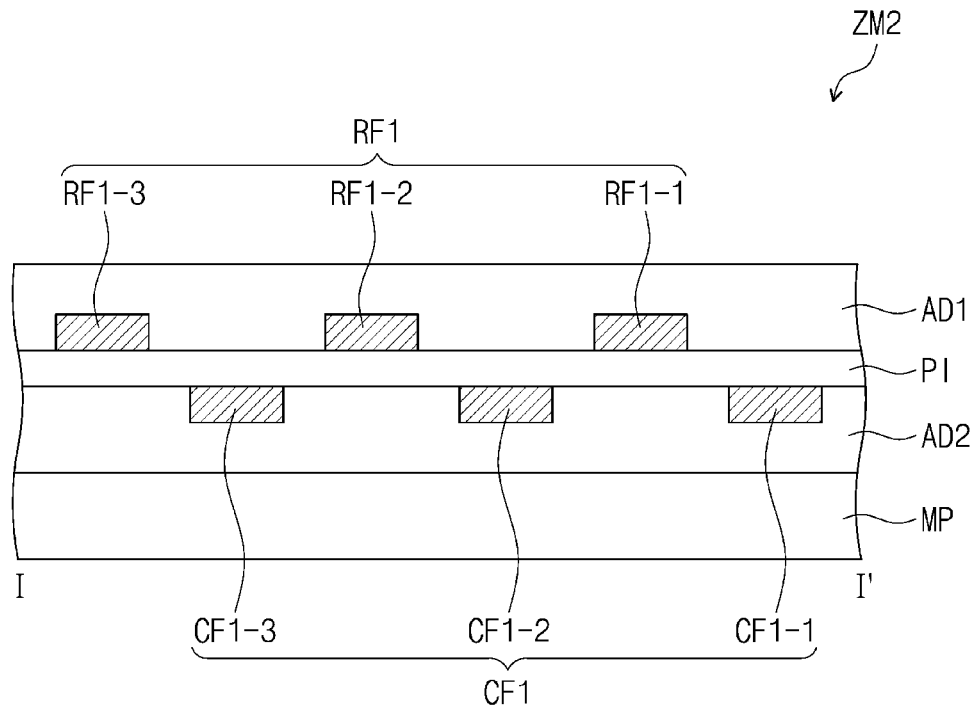
FIG. 7 to FIG. 12 are schematic cross-sectional views of a digitizer according to an embodiment.

Referring to FIG. 7, a digitizer ZM2 may further include the shielding layer MP. The shielding layer MP may be disposed under the second adhesive layer AD2. The shielding layer MP may be a portion of a base layer used as a base substrate during a process of forming the digitizer ZM2.

In an embodiment, the shielding layer MP may include a metal. For example, the shielding layer MP may include at least one of permalloy, invar, and stainless steel. Permalloy and invar are alloys of nickel (Ni) and iron (Fe).

Figure 8:
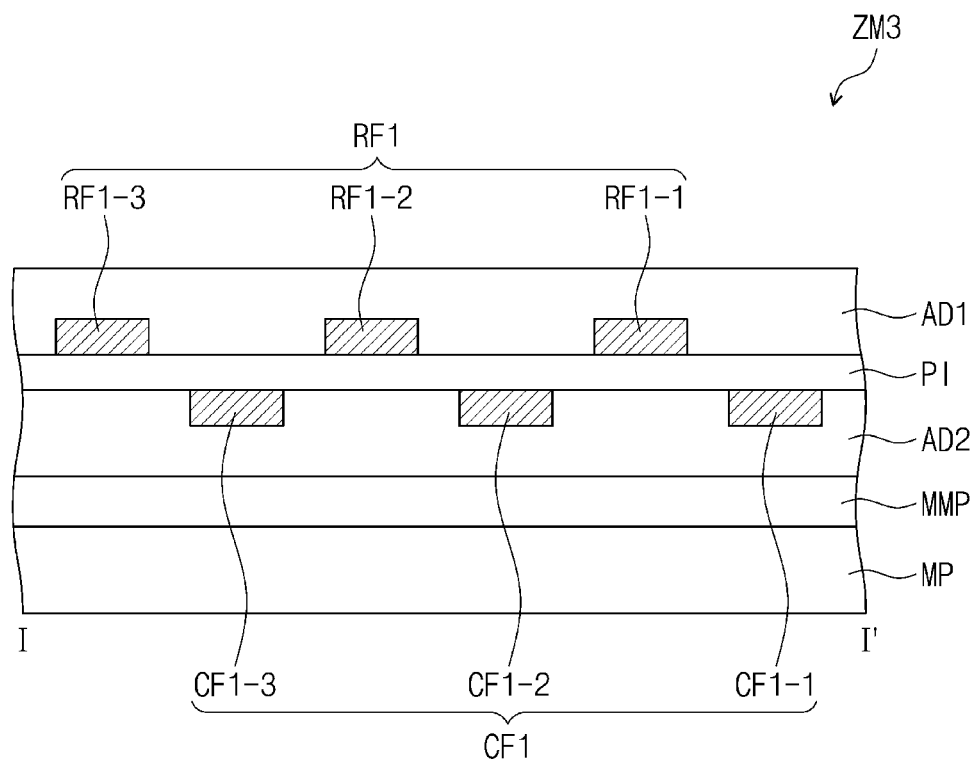

Referring to FIG. 8, a digitizer ZM3 may further include the magnetic sheet MMP. The magnetic sheet MMP may be disposed under the second adhesive layer AD2. The magnetic sheet MMP may be disposed on the shielding layer MP. In an embodiment, the magnetic sheet MMP may be a layer including magnetic metal powder.

The shielding layer MP and the magnetic sheet MMP may prevent electrical interference between the digitizers ZM2 and ZM3 and the components disposed on the lower portions of the digitizers ZM2 and ZM3. Accordingly, an electronic apparatus with improved reliability may be provided.

Figure 9:
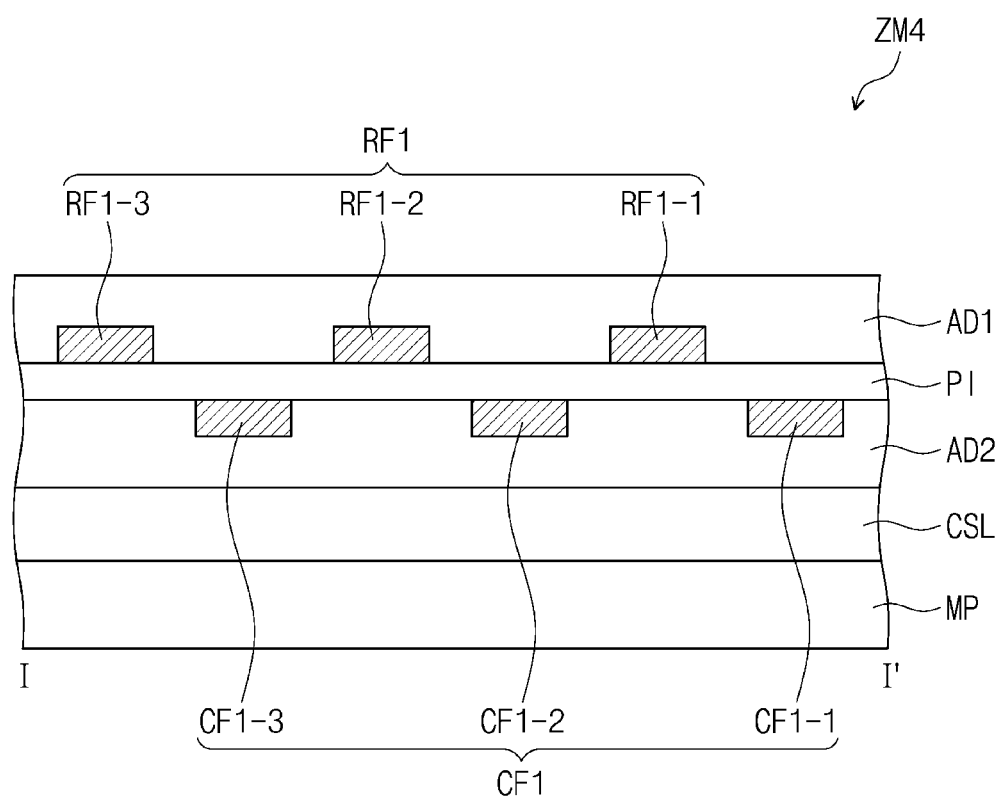

Referring to FIG. 9, a digitizer ZM4 of an embodiment may further include the cushion layer CSL. The cushion layer CSL may be disposed under the second adhesive layer AD2. The cushion layer CSL may be disposed on the shielding layer MP. The cushion layer CSL may be synthetic resin foam. The cushion layer CSL may include a matrix and pores. The cushion layer CSL may have elasticity and may have a porous structure.

The matrix may include a flexible material. The matrix may include a synthetic resin. For example, the matrix may include at least any one of acrylonitrile butadiene styrene copolymer (ABS), polyurethane (PU), polyethylene (PE), ethylene vinyl acetate (EVA), or polyvinyl chloride (PVC).

The pores absorb impacts applied to the cushion layer CSL, easily. The pores may be defined by the cushion layer CSL having a porous structure.

Figure 10:
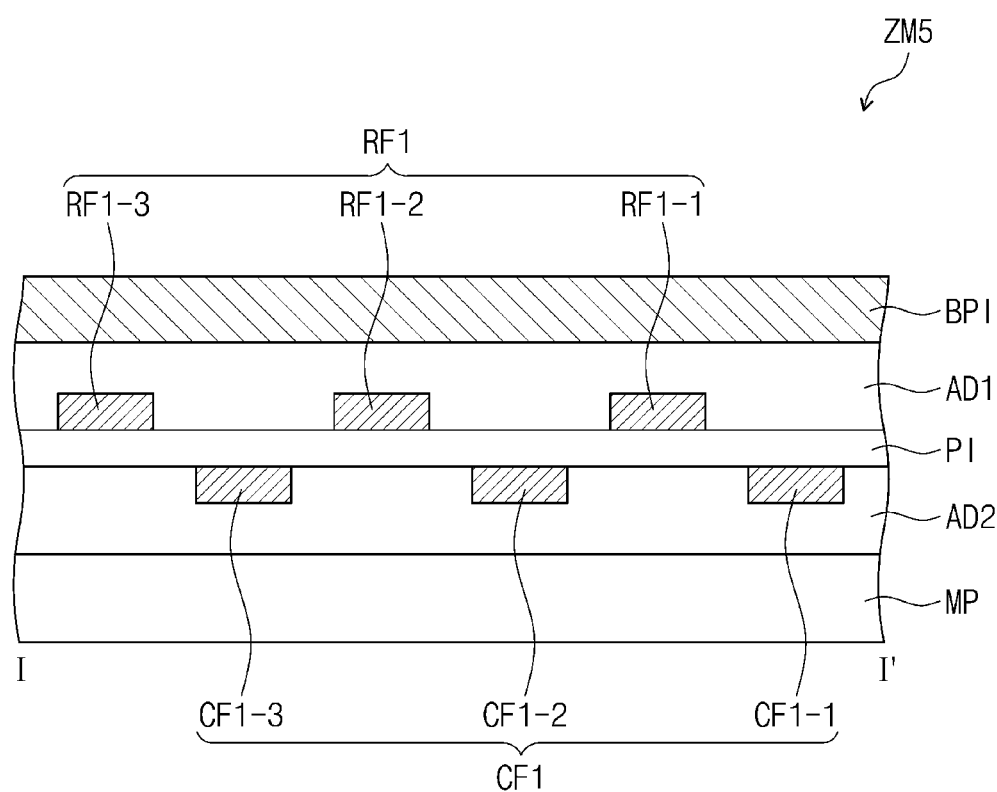

Referring to FIG. 10, a digitizer ZM5 may further include a light blocking layer BPI. The light blocking layer BPI may be disposed on the first adhesive layer AD1. The light blocking layer BPI may serve to solve a problem that components disposed in the display module DM (see FIG. 2A) are projected onto the window WM through the active regions F-AA and R-AA (see FIGS. 1A and 1C). The light blocking layer BPI may have a transmittance of about 50% or less, and to this end, may include a binder and pigment particles dispersed in the binder. The pigment particles may include carbon black and the like. The type of the binder constituting the light blocking layer BPI is not particularly limited, but may be, for example, either polyethyleneterephthalate or polyimide. The electronic apparatus EA (see FIG. 1A) according to an embodiment may include a digitizer ZM5 that includes a light blocking layer BPI, and thus, improvement of light blocking properties may be achieved.

Figure 11:
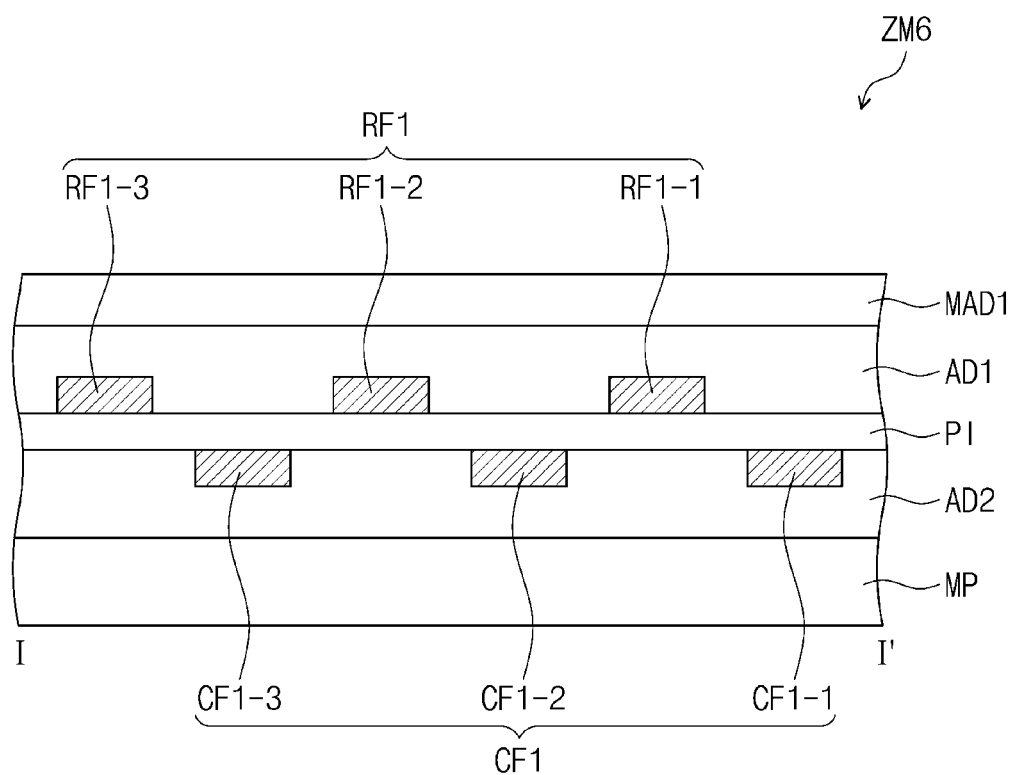
Figure 12:
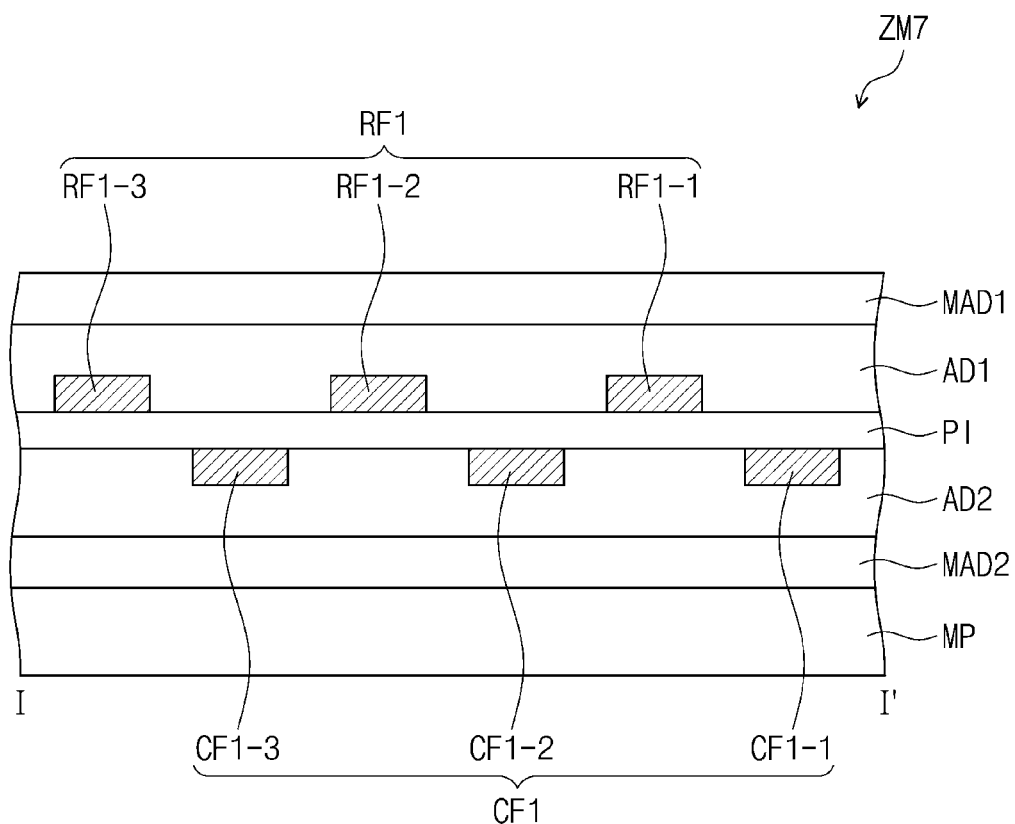

Referring to FIG. 11 and FIG. 12, digitizers ZM6 and ZM7 according to the embodiment may further include the first sub-adhesive layer MAD1. The first sub-adhesive layer MAD1 may be an adhesive layer for controlling a modulus. The first sub-adhesive layer MAD1 may be disposed on the first adhesive layer AD1 and may have a lower storage modulus than the first adhesive layer AD1. The first sub-adhesive layer MAD1 may have a storage modulus of in a range from about 0.01 MPa to about 1 MPa at about −20° C.

The electronic apparatus EA (see FIG. 1A) according to an embodiment may include the digitizers ZM6 and ZM7 including the first sub-adhesive layer MAD1 with a low storage modulus, and thus, folding properties may be improved.

In case that the digitizers ZM6 and ZM7 further include the first sub-adhesive layer MAD1, the sum of the thicknesses of the first sub-adhesive layer MAD1 and the first adhesive layer AD1 may be in a range of about 10 μm to about 50 μm.

Referring to FIG. 12, the digitizer ZM7 according to an embodiment may further include a second sub-adhesive layer MAD2. The second sub-adhesive layer MAD2 may be an adhesive layer for controlling a modulus. The second sub-adhesive layer MAD2 may be disposed below the second adhesive layer AD2 to have a lower storage modulus than the second adhesive layer AD2. The second sub-adhesive layer MAD2 may have a storage modulus of in a range of about 0.01 MPa to about 1 MPa at about −20° C.

The electronic apparatus EA (see FIG. 1A) according to an embodiment may include a digitizer ZM7 that includes the second sub-adhesive layer MAD2 with a low storage modulus, and thus, folding properties may be improved.

In case that the digitizer ZM7 further includes the second sub-adhesive layer MAD2, the sum of the thicknesses of the second sub-adhesive layer MAD2 and the second adhesive layer AD2 may be in a range of about 10 μm to about 50 μm.

FIG. 13A to FIG. 13E are schematic cross-sectional views illustrating a method for manufacturing a digitizer to be included in an electronic apparatus according to an embodiment. The same/similar reference numerals are used for the same/similar components as those of FIG. 1A to FIG. 12, and redundant descriptions thereof are omitted. Hereinafter, with reference to FIG. 13A to FIG. 13E, a method for manufacturing an electronic apparatus according to an embodiment will be described.

The method for manufacturing an electronic apparatus according to an embodiment may include manufacturing a digitizer and disposing a display panel on the digitizer.

Figure 13A:
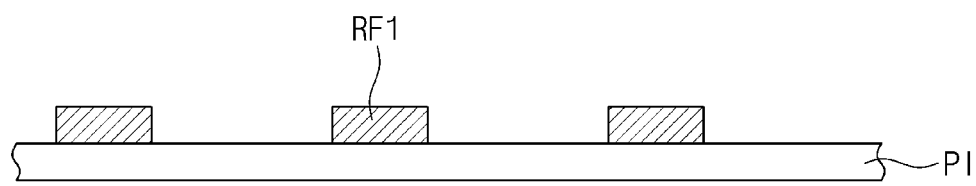
FIG. 13A to FIG. 13E are schematic cross-sectional views sequentially showing a method for manufacturing a digitizer according to an embodiment.
Figure 13B:
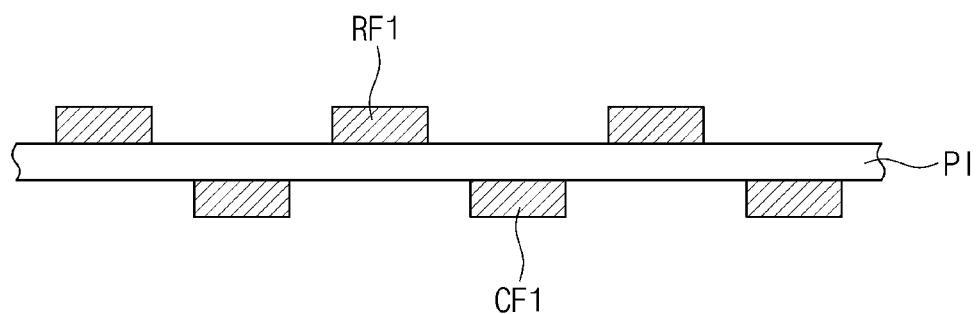

Referring to FIG. 13A and FIG. 13B, the manufacturing of the digitizer may include forming a first sensing coil RF1 on a first surface of the base layer PI and forming a second sensing coil CF1 on a second surface of the base layer PI opposing the first surface.

Figure 13C:
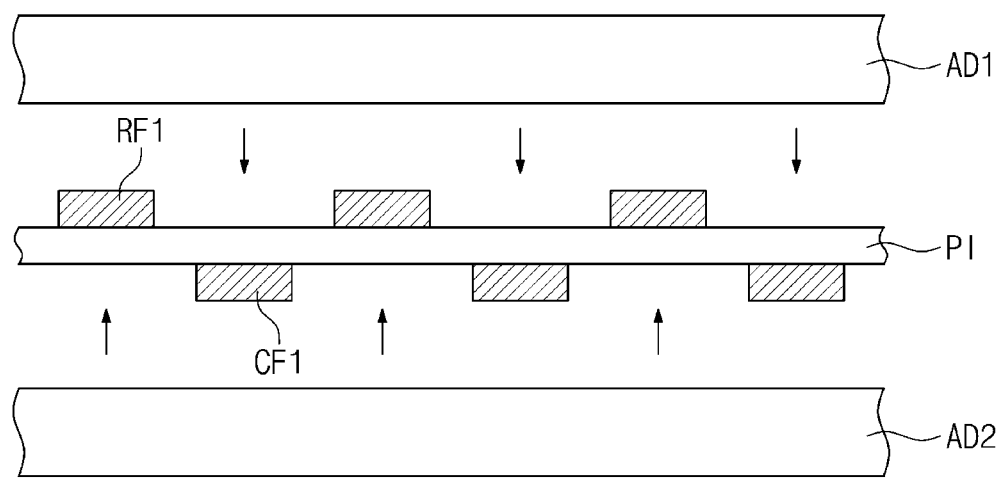

Referring to FIG. 13C, the manufacturing of the digitizer may include disposing a first adhesive layer AD1 in a semi-cured state on the first sensing coil RF1 and disposing a second adhesive layer AD2 in a semi-cured state on the second sensing coil CF1. The first adhesive layer AD1 may be disposed to entirely cover (or overlap) an upper surface of the first sensing coil RF1, and the second adhesive layer AD2 may be disposed to entirely cover (or overlap) an upper surface of the second sensing coil CF1.

However, the order of disposing the first adhesive layer AD1 and the second adhesive layer AD2 is not limited. For example, the first adhesive layer AD1 and the second adhesive layer AD2 may be simultaneously stacked in a lamination manner using a roller. The first adhesive layer AD1 in a semi-cured state and the second adhesive layer AD2 in a semi-cured state are about 50% cured, may have weak adhesion force, and may later be substantially fully cured (for example, completely cured) by irradiating light such as ultraviolet rays.

Figure 13D:
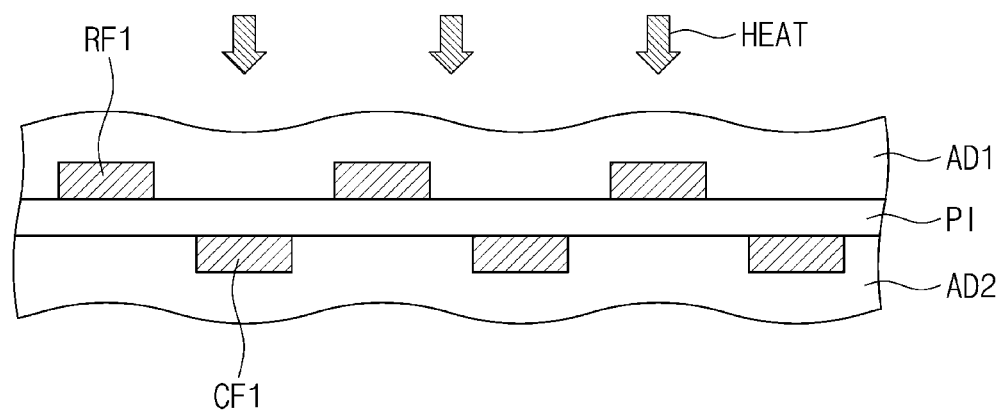

Referring to FIG. 13D, the manufacturing of a digitizer may include increasing the flatness of the first adhesive layer AD1 and of the second adhesive layer AD2. The increasing of the flatness of the first adhesive layer AD1 and of the second adhesive layer AD2 may include heating the first adhesive layer AD1 and the second adhesive layer AD2. For example, heat in a range of about 120° C. to about 170° C. may be applied.

Due to the first sensing coils RF1 and the second sensing coil CF1, on the first adhesive layer AD1 and the second adhesive layer AD2, steps may form on a surface opposing a surface contacting the first sensing coils RF1 and the second sensing coils CF1. In case that heat is applied to the first adhesive layer AD1 and to the second adhesive layer AD2, hot-melt may occur in the first adhesive layer AD1 and in the second adhesive layer AD2. Therefore, the steps that had formed on surfaces of the first adhesive layer AD1 and of the second adhesive layer AD2 may disappear and the surfaces of the first adhesive layer AD1 and of the second adhesive layer AD2 may become flat.

Figure 13E:
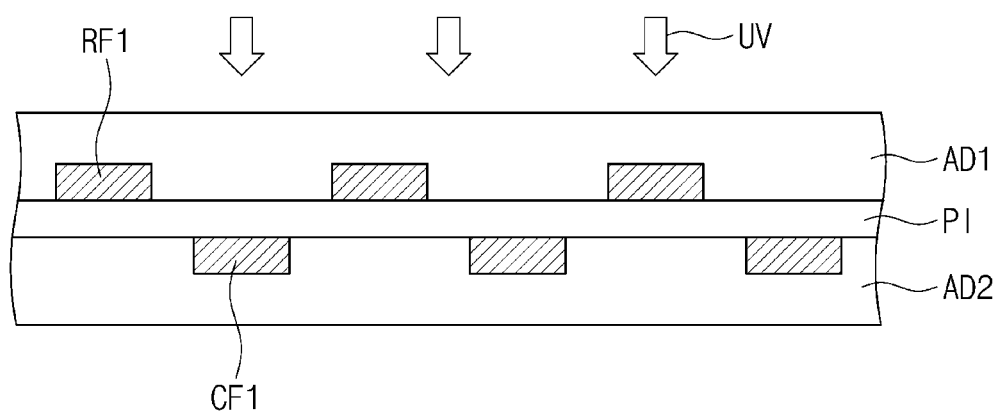

Referring to FIG. 13E, the manufacturing of the digitizer may include irradiating light UV to the first adhesive layer AD1 and to the second adhesive layer AD2. The first adhesive layer AD1 and the second adhesive layer AD2 may include a secondary initiator, and the secondary initiator absorbs the provided light UV to initiate a second curing process, so that the flattened first adhesive layer AD1 and second adhesive layer AD2 are substantially fully cured (for example, completely cured), and the flat surfaces are fixed.

Although not illustrated, the manufacturing of a digitizer may further include forming a first sub-adhesive layer on the first adhesive layer AD1. A step of forming a second sub-adhesive layer under the second adhesive layer AD2 may be further included.

Hereinafter, the embodiments will be described in more detail through properties values when the digitizers of specific Examples and Comparative Examples are applied to an electronic apparatus. The following examples are for illustrative purposes only to facilitate the understanding, and thus, the scope is not limited thereto.

(Electronic Apparatus Properties Comparison)

The surface folding properties and visibility properties were measured for electronic apparatuses to which a digitizer of each of Examples and Comparative Examples was applied, and results are shown in Table 1 below. Electronic apparatuses according to Examples and Comparative Examples have the same configuration except for a digitizer. Configurations of the digitizers of the Examples and the Comparative Examples are as shown in the following Table. Example 3 includes a light blocking layer in which carbon black is dispersed in polyimide, and Example 4 includes a light blocking layer in which carbon black is dispersed in polyethyleneterephthalate.

A common adhesive layer used in each of Comparative Examples 1 and 3 is an adhesive layer substantially fully cured (for example, completely cured) with one time of curing.

The folding properties were measured by the number of repetition of folding at which defects occurred in the electronic apparatuses. The visibility properties were measured by whether wiring was projected onto the first adhesive layers of the digitizers. The high-temperature, high-humidity reliability was measured by time until corrosion occurred in sensing coils of the digitizers under a temperature of about 60° C. and a humidity of about 90%.

TABLE 1

| | Example 1 | Example 2 | Example 3 | Example 4 |
|---|---|---|---|---|
| Upper cover layer | X | X | X | X |
| Lower cover layer | X | X | X | X |
| Light blocking layer | X | X | ○ | ○ |
| Sensing coil plating (Au) treatment | X | X | X | X |
| First adhesive layer | Acid-component-free multi-curing adhesive layer | Acid-component-free multi-curing adhesive layer | Acid-component-free multi-curing adhesive layer | Acid-component-free multi-curing adhesive layer |
| First sub-adhesive layer | X | X | X | X |
| Second adhesive layer | Acid-component-free multi-curing adhesive layer | Acid-component-free multi-curing adhesive layer | Acid-component-free multi-curing adhesive layer | Acid-component-free multi-curing adhesive layer |
| Second sub-adhesive layer | X | X | X | X |
| Shielding layer | ○ | ○ | ○ | ○ |
| Presence of magnetic sheet or cushion layer | X | Magnetic sheet | Cushion layer | X |
| Folding properties | No defect after folding 200K times or more | No defect after folding 200K times or more | No defect after folding 200K times or more | No defect after folding 200K times or more |
| Visibility properties | No wiring projection | No wiring projection | No wiring projection | No wiring projection |
| High-temperature, high-humidity reliability | No corrosion occurs within 500 hours | No corrosion occurs within 500 hours | No corrosion occurs within 500 hours | No corrosion occurs within 500 hours |

TABLE 2

| | Example 5 | Example 6 | Example 7 |
|---|---|---|---|
| Upper cover layer | X | X | X |
| Lower cover layer | X | X | X |
| Light blocking layer | X | X | X |
| Sensing coil plating (Au) treatment | X | X | X |
| First adhesive layer | Acid-component-free multi-curing adhesive layer | Acid-component-free multi-curing adhesive layer | Acid-component-free multi-curing adhesive layer |
| First sub-adhesive layer | X | ○ | ○ |
| Storage modulus of first sub-adhesive layer | — | 0.1 MPa | 0.1 MPa |
| Second adhesive layer | Acid-component-free multi-curing adhesive layer | Acid-component-free multi-curing adhesive layer | Acid-component-free multi-curing adhesive layer |
| Second sub-adhesive layer | X | X | ○ |
| Storage modulus of second sub-adhesive layer | — | — | 0.1 MPa |
| Shielding layer | ○ | ○ | ○ |
| Presence of magnetic sheet or cushion layer | X | X | X |
| Folding properties | No defect after folding 200K times or more | No defect after folding 300K times or more | No defect after folding 300K times or more |
| Visibility properties | No wiring projection | No wiring projection | No wiring projection |
| High-temperature, high-humidity reliability | No corrosion occurs within 500 hours | No corrosion occurs within 500 hours | No corrosion occurs within 500 hours |

TABLE 3

| | Example 8 | Example 9 | Example 10 | Example 11 |
|---|---|---|---|---|
| Upper cover layer | X | X | X | X |
| Lower cover layer | X | X | X | X |
| Light blocking layer | X | X | ○ | ○ |
| Sensing coil plating (Au) treatment | ○ | ○ | ○ | ○ |
| First adhesive layer | Multi-curing adhesive layer | Multi-curing adhesive layer | Multi-curing adhesive layer | Multi-curing adhesive layer |
| First sub-adhesive layer | X | X | X | X |
| Second adhesive layer | Multi-curing adhesive layer | Multi-curing adhesive layer | Multi-curing adhesive layer | Multi-curing adhesive layer |
| Second sub-adhesive layer | X | X | X | X |
| Shielding layer | ○ | ○ | ○ | ○ |
| Presence of magnetic sheet or cushion layer | X | Magnetic sheet | Cushion layer | X |
| Folding properties | No defect after folding 200K times or more | No defect after folding 200K times or more | No defect after folding 200K times or more | No defect after folding 200K times or more |
| Visibility properties | No wiring projection | No wiring projection | No wiring projection | No wiring projection |
| High-temperature, high-humidity reliability | No corrosion occurs within 500 hours | No corrosion occurs within 500 hours | No corrosion occurs within 500 hours | No corrosion occurs within 500 hours |

TABLE 4

|  | Example 12 | Example 13 | Example 14 | Example 15 |
|---|---|---|---|---|
| Upper cover layer | X | X | X | X |
| Lower cover layer | X | X | X | X |
| Light blocking layer | X | X | X | X |
| Sensing coil plating (Au) treatment | ◯ | ◯ | ◯ | X |
| First adhesive layer | Multi-curing adhesive layer | Multi-curing adhesive layer | Multi-curing adhesive layer | Multi-curing adhesive layer |
| First sub-adhesive layer | X | ◯ | ◯ | X |
| Storage modulus of first sub-adhesive layer | — | 0.1 MPa | 0.1 MPa | — |
| Second adhesive layer | Acid-component-free multi-curing adhesive layer | Acid-component-free multi-curing adhesive layer | Acid-component-free multi-curing adhesive layer | Multi-curing adhesive layer |
| Second sub-adhesive layer | X | X | ◯ | X |
| Storage modulus of second sub-adhesive layer | — | — | 0.1 MPa | — |
| Shielding layer | ◯ | ◯ | ◯ | ◯ |
| Presence of magnetic sheet or cushion layer | X | X | X | X |
| Folding properties | No defect after folding 200K times or more | No defect after folding 300K times or more | No defect after folding 300K times or more | No defect after folding at least 200K times or more |
| Visibility properties | No wiring projection | No wiring projection | No wiring projection | No wiring projection |
| High-temperature, high-humidity reliability | No corrosion occurs within 500 hours | No corrosion occurs within 500 hours | No corrosion occurs within 500 hours | Corrosion occurs within 500 hours |

TABLE 5

|  | Comparative Example 1 | Comparative Example 2 | Comparative Example 3 |
|---|---|---|---|
| Upper cover layer | ◯ | ◯ | X |
| Lower cover layer | ◯ | ◯ | X |
| Light blocking layer | X | X | X |
| Sensing coil plating (Au) treatment | X | X | X |
| First adhesive layer | Common adhesive layer | Multi-curing adhesive layer | Common adhesive layer |
| First sub-adhesive layer | X | X | X |
| Second adhesive layer | Common adhesive layer | Multi-curing adhesive layer | Common adhesive layer |
| Second sub-adhesive layer | X | X | X |
| Shielding layer | ◯ | ◯ | ◯ |
| Presence of magnetic sheet or cushion layer | X | X | X |
| Folding properties | No defect after folding 1K times or more | No defect after folding 100K times or more | No defect after folding K times or more |

TABLE 5-continued

|  | Comparative Example 1 | Comparative Example 2 | Comparative Example 3 |
|---|---|---|---|
| Visibility properties | No wiring projection | No wiring projection | Wiring projection |
| High-temperature, high-humidity reliability | No corrosion occurs within 500 hours | No corrosion occurs within 500 hours | Corrosion occurs within 500 hours |

Referring to the results shown in Table 1 to Table 5, an electronic apparatus according to an embodiment includes a digitizer that includes a first adhesive layer and a second adhesive layer, which are multi-curing, and thus, has improved folding properties and improved visibility properties, even without a separate cover layer. Furthermore, by disposing a first sub-adhesive layer and/or a second sub-adhesive layer with a controlled storage modulus on the first adhesive layer and the second adhesive layer, an electronic apparatus with further improved folding properties may be provided.

As a result, it can be confirmed that an electronic apparatus according to an embodiment may provide excellent reliability either by including an adhesive layer which is multi-curing or by plating the sensing coil.

According to an embodiment, a digitizer may be applied to a foldable electronic apparatus, so that an input by a pen and the like may be sensed, and the folding reliability of the electronic apparatus may be improved.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. An electronic apparatus comprising:
a window;
a display panel disposed below the window; and
a digitizer disposed below the display panel, the digitizer including:
a base layer including a first surface and a second surface opposing the first surface;
a first sensing coil disposed on the first surface of the base layer;
a second sensing coil disposed on the second surface of the base layer;
a first adhesive layer disposed on the first sensing coil;
a second adhesive layer disposed on the second sensing coil; and
a first sub-adhesive layer disposed on the first adhesive layer, wherein
the first sub-adhesive layer has a storage modulus lower than a storage modulus of the first adhesive layer, and
the first adhesive layer and the second adhesive layer are multi-curing adhesive layers.

2. The electronic apparatus of claim 1, further comprising:
a shielding layer disposed under the second adhesive layer, the shielding layer including a metal, wherein the shielding layer comprises at least one of permalloy, invar, and stainless steel.

3. The electronic apparatus of claim 2, further comprising:
a magnetic sheet disposed on the shielding layer, the magnetic sheet including magnetic metal powder (MMP).

4. The electronic apparatus of claim 1, further comprising:
a second sub-adhesive layer disposed below the second adhesive layer,
wherein the second sub-adhesive layer has a storage modulus lower than a storage modulus of the second adhesive layer.

5. The electronic apparatus of claim 4, wherein the storage modulus of the second sub-adhesive layer is in a range of about 0.01 MPa to about 1 MPa at about −20° C.

6. The electronic apparatus of claim 1, wherein
the first adhesive layer entirely overlaps an upper surface of the first sensing coil, and
the second adhesive layer entirely overlaps an upper surface of the second sensing coil.

7. The electronic apparatus of claim 1, wherein the first adhesive layer and the second adhesive layer include a secondary initiator.

8. The electronic apparatus of claim 1, wherein the storage modulus of the first sub-adhesive layer is in a range of about 0.01 MPa to about 1 MPa at about −20° C.

9. The electronic apparatus of claim 1, further comprising:
a cushion layer disposed below the second adhesive layer.

10. The electronic apparatus of claim 1, further comprising:
a light blocking layer disposed on the first adhesive layer, the light blocking layer having a transmittance of about 50% or less.

11. The electronic apparatus of claim 1, further comprising:
a folding region foldable with respect to a folding axis extending in one direction;
a first non-folding region extending toward a side of the folding region; and
a second non-folding region extending toward another side of the folding region.

12. The electronic apparatus of claim 1, wherein
the first adhesive layer directly contacts the first sensing coil, and
the second adhesive layer directly contacts the second sensing coil.

13. An electronic apparatus comprising:
a window;
a display panel disposed below the window; and
a digitizer disposed below the display panel, the digitizer including:
a base layer including a first surface and a second surface opposing the first surface;

a first sensing coil disposed on the first surface of the base layer;
a second sensing coil disposed on the second surface of the base layer;
a first adhesive layer disposed on the first sensing coil; and
a second adhesive layer disposed on the second sensing coil, wherein
the digitizer comprises a plating layer on an upper surface of each of the first sensing coil and the second sensing coil, as
the first sensing coil is spaced apart from the first adhesive layer by only the plating layer
the second sensing coil is spaced apart from the second adhesive layer by only the plating layer
each of the first adhesive layer and the second adhesive layer comprise an acid,
the plating layer prevents corrosion of each of the first and the second sensing coils by the acid by the spacing apart of the first adhesive layer from the first sensing coil and the spacing apart of the second adhesive layer from the second sensing coil, and
the plating layer includes a material selected from Sn, Ag, Au, Ni, and an alloy thereof.

14. The electronic apparatus of claim 13, wherein:
the first sensing coil is spaced apart everywhere from the first adhesive layer by only the plating layer,
the second sensing coil is spaced apart everywhere from the second adhesive layer by only the plating layer.

15. The electronic apparatus of claim 13, wherein
the digitizer senses external input by an ElectroMagnetic Resonance (EMR) technique,
the first sensing coil corresponds to an input coil,
the second sensing coil corresponds to an output coil,
each of the first adhesive layer and the second adhesive layer has a storage modulus in a range of about 0.5 MPa to about 5 MPa at about −20° C., and
the first adhesive layer and the second adhesive layer are multi-curing adhesive layers.

16. The electronic apparatus of claim 13, wherein
a folding region foldable with respect to a folding axis extending in one direction,
a first non-folding region extending toward a side of the folding region,
a second non-folding region extending toward another side of the folding region, and
at least a portion of the digitizer is disposed in the folding region.

17. An electronic apparatus comprising:
a window;
a display panel disposed below the window; and
a digitizer disposed below the display panel, the digitizer including:
a base layer including a first surface and a second surface opposing the first surface;
a first sensing coil disposed on the first surface of the base layer;
a second sensing coil disposed on the second surface of the base layer;
a first adhesive layer disposed on the first sensing coil; and
a second adhesive layer disposed on the second sensing coil, wherein
the first adhesive layer and the second adhesive layer are multi-curing adhesive layers, and
the first adhesive layer and the second adhesive layer do not comprise an acid component.

18. An electronic apparatus comprising:
a window;
a display panel disposed below the window; and
a digitizer disposed below the display panel, the digitizer including:
a base layer including a first surface and a second surface opposing the first surface;
a first sensing coil disposed on the first surface of the base layer;
a second sensing coil disposed on the second surface of the base layer;
a first adhesive layer disposed on the first sensing coil; and
a second adhesive layer disposed on the second sensing coil, wherein
the first adhesive layer and the second adhesive layer are multi-curing adhesive layers,
each of the first adhesive layer and the second adhesive layer has a storage modulus in a range of about 0.5 MPa to about 5 MPa at about −20° C., and
a first adhesive is disposed on the first surface of the base layer and a second adhesive is disposed on the second surface of the base layer.

* * * * *